US012252387B2

(12) United States Patent
Kuo et al.

(10) Patent No.: US 12,252,387 B2
(45) **Date of Patent: *Mar. 18, 2025**

(54) FLUID MATERIAL DISPENSING APPARATUS FOR FLEXIBLY ADJUSTING TEMPERATURE OF MATERIAL TO BE DISPENSED

(71) Applicant: Botrista, Inc., Dover, DE (US)

(72) Inventors: Wu-Chou Kuo, San Francisco, CA (US); Yu-Min Lee, Taipei (TW); Yu Wei Chen, San Francisco, CA (US)

(73) Assignee: Botrista, Inc., Dover, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/816,620

(22) Filed: Aug. 27, 2024

(65) Prior Publication Data

US 2024/0417236 A1 Dec. 19, 2024

Related U.S. Application Data

(60) Continuation-in-part of application No. 18/375,114, filed on Sep. 29, 2023, now Pat. No. 12,116,259, (Continued)

(51) Int. Cl.
*B67D 1/07* (2006.01)
*B67D 1/12* (2006.01)

(52) U.S. Cl.
CPC ............. *B67D 1/07* (2013.01); *B67D 1/1277* (2013.01)

(58) Field of Classification Search
CPC ................................ B67D 1/07; B67D 1/1277
See application file for complete search history.

(56) References Cited

U.S. PATENT DOCUMENTS 360,422 A * 4/1887 Dougherty ........... B67D 1/0425 92/92
6,669,051 B1 12/2003 Phallen et al.
(Continued)

FOREIGN PATENT DOCUMENTS

CN 104154267 A 11/2014
CN 102781293 B 8/2015
WO WO 2011/107574 A2 9/2011

OTHER PUBLICATIONS

US Office Action for U.S. Appl. No. 18/763,899, dated Oct. 23, 2024.
(Continued)

*Primary Examiner* — Jeremy Carroll
(74) *Attorney, Agent, or Firm* — Birch, Stewart, Kolasch & Birch, LLP

(57) ABSTRACT

A fluid material dispensing apparatus include: a material output connector; a water output connector; a pump, arranged to operably extract a fluid material from a material container and to operably push the fluid material to flow toward the material output connector; a water input port, arranged to operably supply water to the water output connector; a temperature adjustment device, arranged to operably receive the fluid material passed through the material output connector and the water passed through the water output connector, so as to form a mixed material; a nozzle, coupled with the temperature adjustment device; and a control circuit, arranged to operably control the pump and the nozzle, and to operably control the temperature adjustment device to adjust a temperature of the mixed material to produce and output a temperature-adjusted material to the nozzle, so that the nozzle outputs the temperature-adjusted material to a target container.

18 Claims, 18 Drawing Sheets

Related U.S. Application Data which is a division of application No. 17/467,960, filed on Sep. 7, 2021, now Pat. No. 11,814,280, which is a continuation-in-part of application No. 17/218,314, filed on Mar. 31, 2021, now Pat. No. 11,597,642.

(60) Provisional application No. 63/636,426, filed on Apr. 19, 2024, provisional application No. 63/143,217, filed on Jan. 29, 2021, provisional application No. 63/110,621, filed on Nov. 6, 2020.

(56) References Cited

U.S. PATENT DOCUMENTS

| | | | | |
|---|---|---|---|---|
| 6,695,168 | B2 | 2/2004 | Pinedjian et al. | |
| 10,561,281 | B1 | 2/2020 | Lu et al. | |
| 10,662,053 | B2 | 5/2020 | Petermann | |
| 10,689,239 | B1 | 6/2020 | Siegel | |
| 11,407,629 | B1 | 8/2022 | Siegel | |
| 2007/0151992 | A1* | 7/2007 | Carlson | B67D 1/0867 222/509 |
| 2008/0141702 | A1* | 6/2008 | Gagliano | B67D 1/1275 62/389 |
| 2010/0176147 | A1* | 7/2010 | Segers | B67D 1/0837 222/1 |
| 2011/0049185 | A1 | 3/2011 | Buchik | |
| 2012/0328456 | A1* | 12/2012 | Maisch | A47J 31/468 417/375 |
| 2016/0297665 | A1 | 10/2016 | Petermann | |
| 2021/0316979 | A1 | 10/2021 | Hayes-Pankhurst et al. | |
| 2023/0380442 | A1* | 11/2023 | Carter | A23G 9/228 |
| 2023/0380443 | A1* | 11/2023 | Cloud | F25B 41/20 |

OTHER PUBLICATIONS

Chinese Office Action and Search Report for Chinese Application No. 202111040353.0, dated Jan. 27, 2024, with English translation of the Search Report.

Taiwanese Notice of Allowance dated Dec. 10, 2021 for Application No. 110133099 with an English translation.

Taiwanese Office Action and Search Report, dated Jul. 14, 2021, for Taiwanese Application No. 110112000, with a partial English translation of the Taiwanese Office Action and a full English translation of the Taiwanese Search Report.

* cited by examiner

FLUID MATERIAL DISPENSING APPARATUS FOR FLEXIBLY ADJUSTING TEMPERATURE OF MATERIAL TO BE DISPENSED

CROSS-REFERENCE TO RELATED APPLICATIONS

This application is a Continuation-In-Part of and claims the benefit of priority to co-pending U.S. patent application Ser. No. 18/375,114, filed on Sep. 29, 2023, which is a Divisional of U.S. patent application Ser. No. 17/467,960, filed on Sep. 7, 2021, now U.S. Pat. No. 11,814,280, issued on Nov. 14, 2023, which is a Continuation-In-Part of and claims the benefit of priority to U.S. patent application Ser. No. 17/218,314, filed on Mar. 31, 2021, now U.S. Pat. No. 11,597,642, issued on Mar. 7, 2022; which claims the benefit of U.S. Provisional Application Ser. No. 63/110,621, filed on Nov. 6, 2020, and also claims the benefit of U.S. Provisional Application Ser. No. 63/143,217, filed on Jan. 29, 2021; the entirety of which is incorporated herein by reference for all purposes.

This application claims the benefit of priority to U.S. Provisional Application Ser. No. 63/636,426, filed on Apr. 19, 2024; the entirety of which is incorporated herein by reference for all purposes.

BACKGROUND

The disclosure generally relates to a fluid material dispensing apparatus and, more particularly, to a fluid material dispensing apparatus capable of flexibly adjusting the temperature of water to be dispensed.

For many consumers, freshly made beverages are more attractive than factory-produced canned or bottled beverages in many aspects, such as freshness, taste, and/or flexibility of customizing ingredient combinations. Therefore, many restaurants and beverage vendors offer a variety of freshly made beverages to meet the needs of their customers. The traditional approach of manually preparing freshly made beverages has many disadvantages. For example, it is not easy to maintain the taste consistency of freshly made beverages, personnel training requires considerable time and cost, and the preparation of the freshly made beverages often consumes a lot of labor time, or the like. As a result of rising labor costs and other factors (e.g., increased operating costs due to the impact of the pandemic or inflation), many restaurants and beverage vendors have begun to use a variety of machinery and equipment to provide or assist in the preparation of freshly-made beverages in order to reduce the required labor time and costs.

As is well known, different customers have varying preferences or needs regarding the temperature of their beverages. However, the traditional beverage dispensers lack the ability of flexibly adjusting the temperature of beverages according to customer preferences, so they usually can only provide beverages at a fixed temperature. If a customer wants to change the temperature of the beverage, either the customer or the staff would need to add ice into or heat the beverage made by the traditional beverage dispenser. Such approaches are not only inconvenient but also make it difficult to precisely control the temperature of the resulting beverage, and may even adversely affect the taste of the resulting beverage.

SUMMARY

An example embodiment of a fluid material dispensing apparatus is disclosed, comprising: a material output connector; a water output connector; a pump, coupled between an outlet connector of a material container and the material output connector, and arranged to operably extract a fluid material from the material container and to operably push the fluid material to flow toward the material output connector; a water input port, coupled with the water output connector, and arranged to operably supply water to the water output connector; a temperature adjustment device, coupled with the material output connector and the water output connector, and arranged to operably receive the fluid material passed through the material output connector and the water passed through the water output connector, so as to form a mixed material within the temperature adjustment device; a nozzle, coupled with an output terminal of the temperature adjustment device; and a control circuit, arranged to operably control the pump and the nozzle, and further arranged to operably control the temperature adjustment device to adjust a temperature of the mixed material within the temperature adjustment device to produce and output a temperature-adjusted material to the nozzle, so that the nozzle outputs the temperature-adjusted material to a target container.

Another example embodiment of a fluid material dispensing apparatus is disclosed, comprising: a first output connector; a second output connector; a first pump, coupled between an outlet connector of a first material container and the first output connector, and arranged to operably extract a first fluid material from the first material container and to operably push the first fluid material to flow toward the first output connector; a second pump, coupled between an outlet connector of a second material container and the second output connector, and arranged to operably extract a second fluid material from the second material container and to operably push the second fluid material to flow toward the second output connector; a temperature adjustment device, coupled with the first output connector and the second output connector, and arranged to operably receive the first fluid material passed through the first output connector and the second fluid material passed through the second output connector, so as to form a mixed material within the temperature adjustment device; a nozzle, coupled with an output terminal of the temperature adjustment device; and a control circuit, arranged to operably control the first pump, the second pump, and the nozzle, and further arranged to operably control the temperature adjustment device to adjust a temperature of the mixed material within the temperature adjustment device to produce and output a temperature-adjusted material to the nozzle, so that the nozzle outputs the temperature-adjusted material to a target container.

Another example embodiment of a fluid material dispensing apparatus is disclosed, comprising: a material output connector; a water output connector; a pump, coupled between an outlet connector of a material container and the material output connector, and arranged to operably extract a fluid material from the material container and to operably push the fluid material to flow toward the material output connector; a water input port, coupled with the water output connector, and arranged to operably supply water to the water output connector; a temperature adjustment device, comprising: an adjustment chamber, coupled with the material output connector, the water output connector, and the nozzle, and arranged to operably receive the fluid material passed through the material output connector and to operably receive the water passed through the water output connector; a blending device, arranged to operably mix the fluid material and the water within the adjustment chamber to form a mixed material; a heating device, arranged to operably heat the mixed material within the adjustment chamber; a cooling device, arranged to operably cool the mixed material within the adjustment chamber; and a high-pressure water spray device, arranged to operably spray a predetermined volume of high-pressure water to an inner surface of the adjustment chamber, wherein the predetermined volume ranges from 20 milliliters to 150 milliliters; a flowmeter, coupled between the outlet connector and the temperature adjustment device, and arranged to operably measure a flow of the fluid material to be transmitted to the temperature adjustment device; a nozzle, coupled with an output terminal of the temperature adjustment device; a control circuit, arranged to operably control the pump and the nozzle, and further arranged to operably control the temperature adjustment device to adjust a temperature of the mixed material within the temperature adjustment device to produce and output a temperature-adjusted material to the nozzle, so that the nozzle outputs the temperature-adjusted material to a target container; and a temperature sensor, coupled with the control circuit, and arranged to operably sense and report the temperature of the mixed material within the adjustment chamber to the control circuit.

Both the foregoing general description and the following detailed description are examples and explanatory only, and are not restrictive of the invention as claimed.

DETAILED DESCRIPTION

Reference is made in detail to embodiments of the invention, which are illustrated in the accompanying drawings. The same reference numbers may be used throughout the drawings to refer to the same or like parts, components, or operations.

Figure 1:
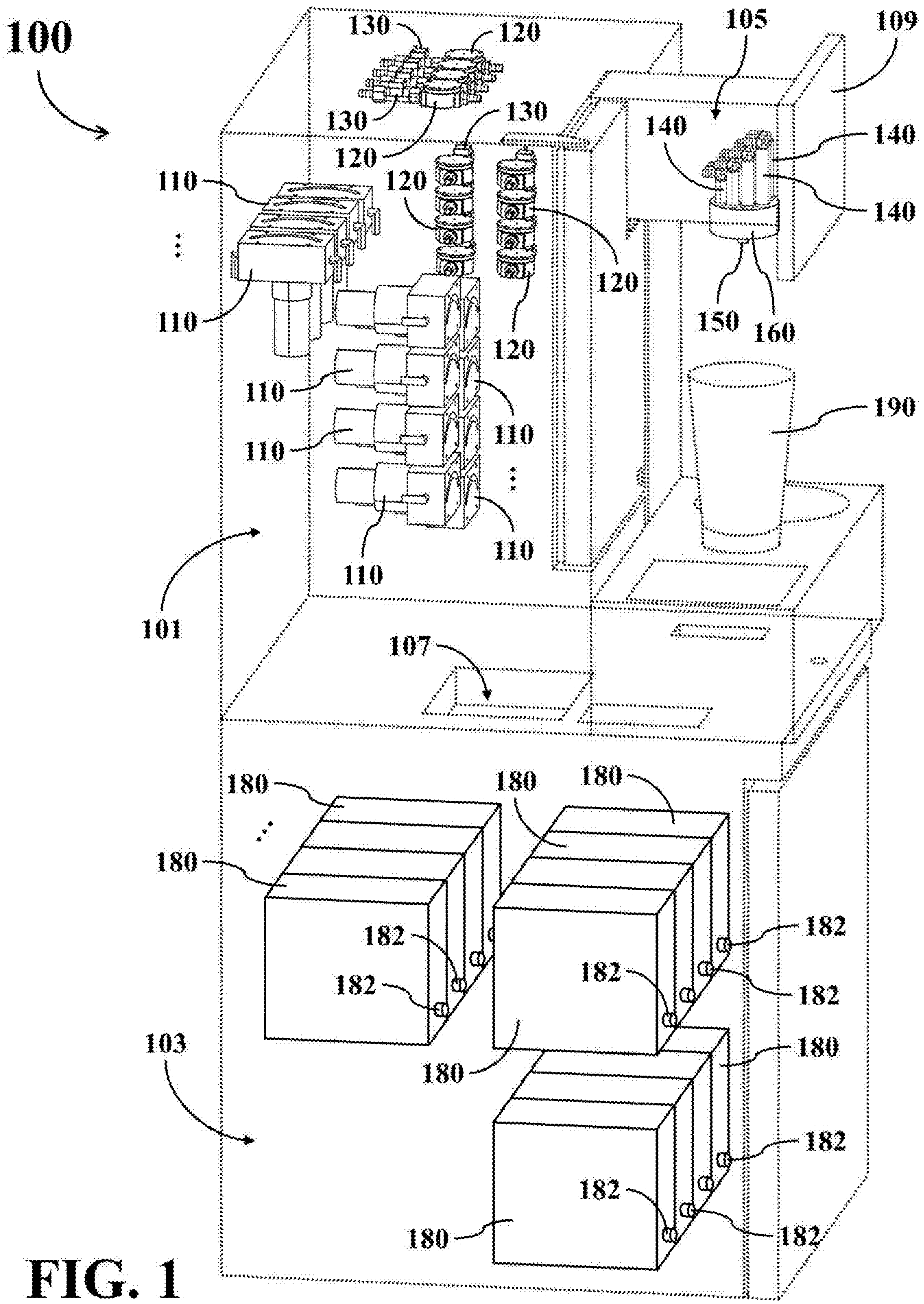
FIG. 1 shows a simplified schematic perspective diagram of a fluid material dispensing apparatus according to one embodiment of the present disclosure.
Figure 2:
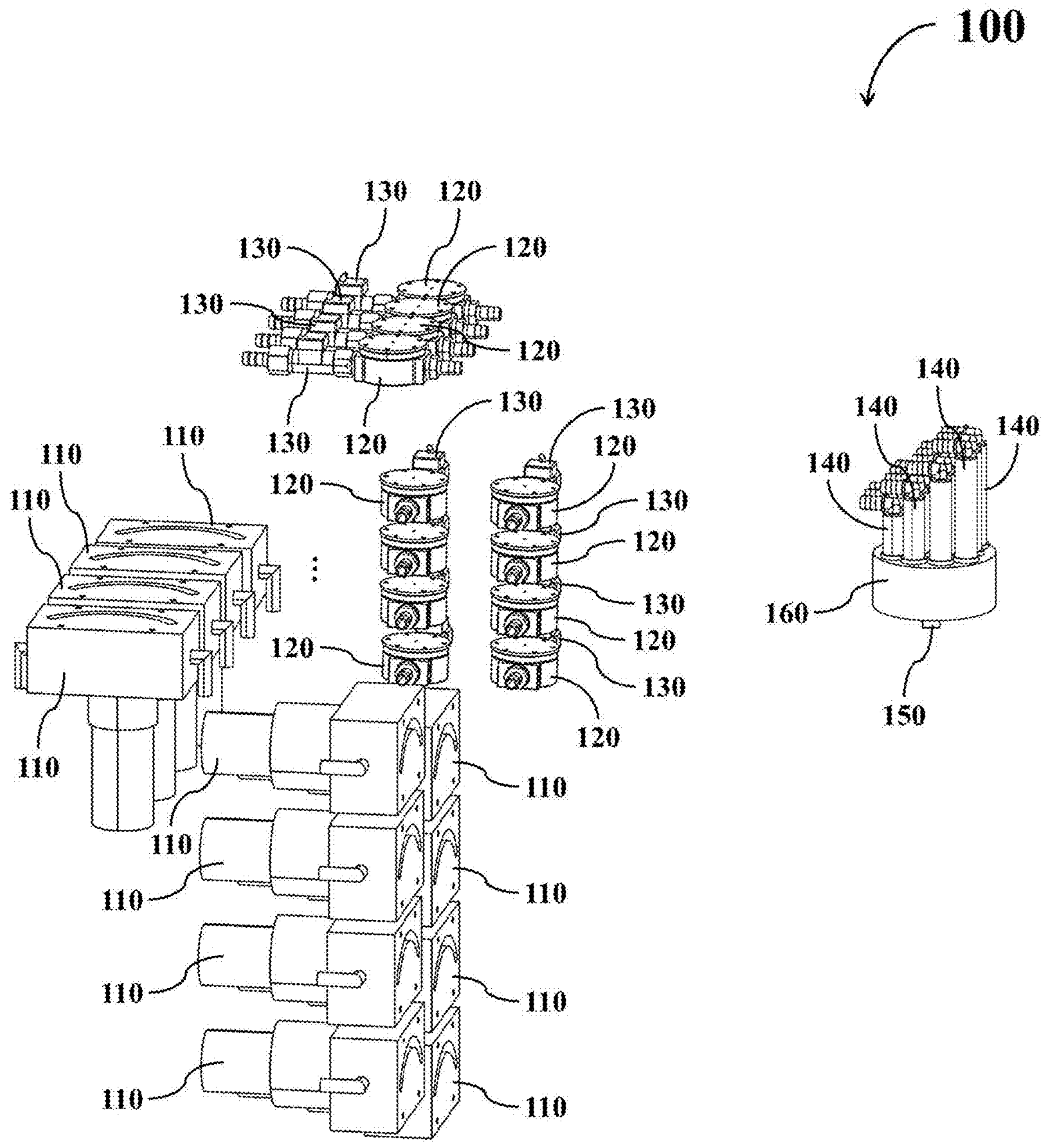
FIGS. 2~3 show simplified schematic diagrams illustrating spatial arrangement of some components of the fluid material dispensing apparatus of FIG. 1 from different viewing angles.
Figure 3:
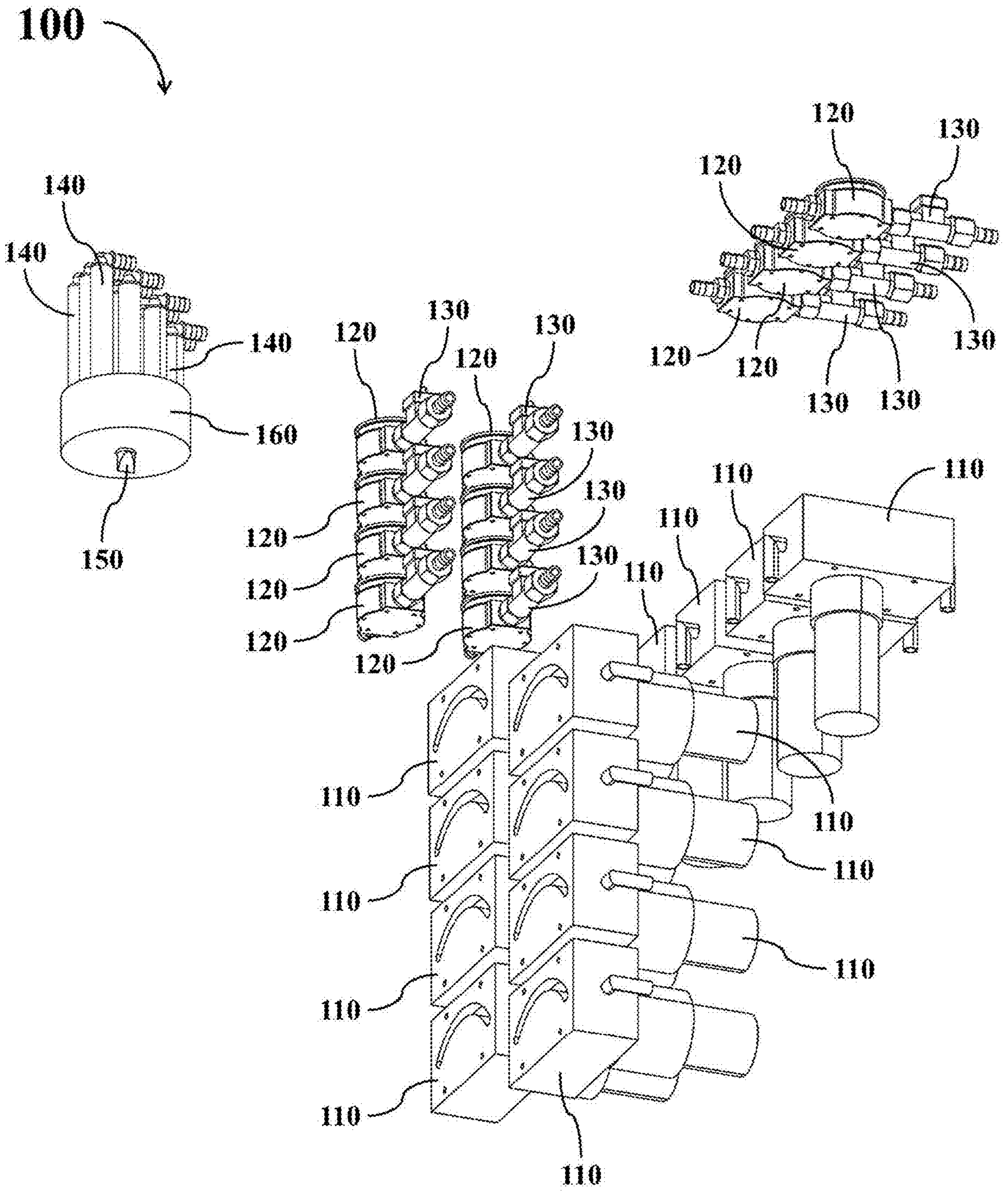

Please refer to FIG. 1 through FIG. 3. FIG. 1 shows a simplified schematic perspective diagram of a fluid material dispensing apparatus 100 according to one embodiment of the present disclosure. FIGS. 2~3 show simplified schematic diagrams illustrating spatial arrangement of some components of the fluid material dispensing apparatus 100 from different viewing angles. The fluid material dispensing apparatus 100 may be utilized to automatically conduct beverage preparation operations to make beverages or output various fluid materials (e.g., various sauces) for use in food seasoning.

In the embodiment of FIG. 1, the fluid material dispensing apparatus 100 comprises an upper chamber 101, a lower chamber 103, a neck chamber 105, one or more connecting channels 107, and a control panel 109. In order to reduce the complexity of the drawing contents, the appearance outline of the fluid material dispensing apparatus 100 is deliberately represented by dashed lines in FIG. 1, while some internal objects to be further described in the following are depicted with solid lines. Please note that the appearance shape of the fluid material dispensing apparatus 100 is merely a simplified exemplary embodiment for the purpose of explanatory convenience, rather than a restriction to the actual appearance of the fluid material dispensing apparatus 100.

The upper chamber 101 of the fluid material dispensing apparatus 100 may be connected to the neck chamber 105, and may be connected to the lower chamber 103 through the connecting channel 107. Relevant wires, signal lines, connectors, and/or material transmission pipes may be arranged inside the fluid material dispensing apparatus 100 in a variety of appropriate ways.

As shown in FIG. 1 through FIG. 3, the fluid material dispensing apparatus 100 further comprises a plurality of pumps 110, a plurality of damper devices 120, a plurality of flowmeters 130, a plurality of output connectors 140, a nozzle 150, and a temperature adjustment device 160.

Each of the aforementioned pumps 110 may be connected to other components through various material transmission pipes and connectors, and may be installed within the upper chamber 101, the lower chamber 103, and/or the neck chamber 105 in a variety of appropriate spatial arrangements, not restricted to the spatial arrangement shown in FIG. 1 through FIG. 3.

Each of the aforementioned damper devices 120 and flowmeters 130 may be connected to other components through various material transmission pipes and connectors, and may be installed within the upper chamber 101, the lower chamber 103, and/or the neck chamber 105 in a variety of appropriate spatial arrangements, not restricted to the spatial arrangement shown in FIG. 1 through FIG. 3.

The aforementioned output connectors 140 may be respectively connected to other components through various suitable material transmission pipes and connectors to increase the selection flexibility of the position of respective output connectors 140. For example, the input terminal of respective output connectors 140 may be connected to the output terminal of a corresponding pump 110, the output terminal of a corresponding damper device 120, or the output terminal of a corresponding flowmeter 130 through various suitable material transmission pipes and connectors. In practice, the output connectors 140 may be realized with various appropriate connectors, gating devices, check valves, solenoid valves, or the like.

The aforementioned temperature adjustment device 160 may be coupled with the output terminals of the plurality of output connectors 140 through various material transmission pipes and connectors to receive different fluid materials from different output connectors 140, and arranged to operably transmit received fluid materials to the nozzle 150. For example, the temperature adjustment device 160 may be directly connected to the output terminals of the plurality of output connectors 140. In some embodiments, the temperature adjustment device 160 may be indirectly connected to the output terminal of the plurality of output connectors 140 through a connector with other appropriate material transmission pipes, so as to increase the selection flexibility of the position of the temperature adjustment device 160. Different fluid materials transmitted into the temperature adjustment device 160 through the output connectors 140 may be passively mixed together to form a mixed material within the temperature adjustment device 160. In some embodiments, the temperature adjustment device 160 may be arranged to actively mix different fluid materials transmitted from the output connectors 140 to form a mixed material. The temperature adjustment device 160 may be entirely or partially installed within the neck chamber 105 in a variety of appropriate spatial arrangements, not restricted to the spatial arrangement shown in FIG. 1 through FIG. 3.

The aforementioned nozzle 150 may be coupled with the output terminal of the temperature adjustment device 160, and arranged to operably output the mixed material transmitted from the temperature adjustment device 160 to the target container 190. For example, the input terminal of the nozzle 150 may be directly connected to the output terminal of the temperature adjustment device 160, or may be indirectly connected to the output terminal of the temperature adjustment device 160 through a switch device (not shown) and/or various material transmission pipes and connectors.

The output terminal of the nozzle 150 can be exposed outside the neck chamber 105 to facilitate the user to carry out relevant cleaning procedures. The nozzle 150 may be realized with a duckbill valve, a check valve, a solenoid valve, or other appropriate valves.

As shown in FIG. 1, multiple material containers 180 may be placed within the lower chamber 103 of the fluid material dispensing apparatus 100. Different material containers 180 may be utilized to store different fluid materials. For example, the aforementioned fluid material may be common beverage base materials, such as water, sparkling water, black tea, green tea, soy milk, milk, milk-based liquids, coffee, nut pulps, various fruit-based concentrates, various vegetable-based concentrates, or the like.

For another example, the aforementioned fluid material may be various syrups, such as agave syrup, dulce de leche, fructose, golden syrup, lemonade syrups, maltose syrup, maple syrup, molasses, orgeat, and/or palm syrup, or the like.

For yet another example, the aforementioned fluid material may be various alcoholic beverages, such as beer, cocktails, and/or sake, or the like.

For yet another example, the aforementioned fluid material may be various sauces or fluid condiments, such as apple sauce, chutneys, cranberry sauce, salad dressings, fruit coulis, ketchup, tomato sauce, mayonnaise, meat gravies, miso sauce, hummus, pasta sauce, piccalilli, soy sauce, spices sauce, and/or ginger jam, or the like.

For yet another example, the aforementioned fluid material may be various fluid materials, such as fruit juices containing fruit pulps, tea liquids with small particles (e.g., pearl or tapioca balls), honey, cooking oils, vinegar, jams, marmalade, pressed fruit paste, beer vinegar, buttercream, condensed milk, and/or cream, or the like.

As can be appreciated from the foregoing descriptions, the fluid material that the fluid material dispensing apparatus 100 can output may be fluid having higher viscosity than water, and may be fluid having lower viscosity than water.

Each material container 180 has an outlet connector 182, which may be connected to a corresponding component (e.g., a corresponding pump 110 or a corresponding damper device 120) through various material transmission pipes and connectors.

In other embodiments, all of or some of the material containers 180 may be instead placed within the upper chamber 101, without being restricted to the spatial arrangement shown in FIG. 1. In practice, appropriate refrigeration equipment may be installed within the fluid material dispensing apparatus 100 to extend the storage time of various fluid materials.

Please note that the quantity of the pumps 110, the damper devices 120, the flowmeters 130, the output connectors 140, the nozzle 150, and the material containers 180 shown in FIG. 1 through FIG. 3 is merely an exemplary embodiment, rather than a restriction to the practical implementations.

Figure 4:
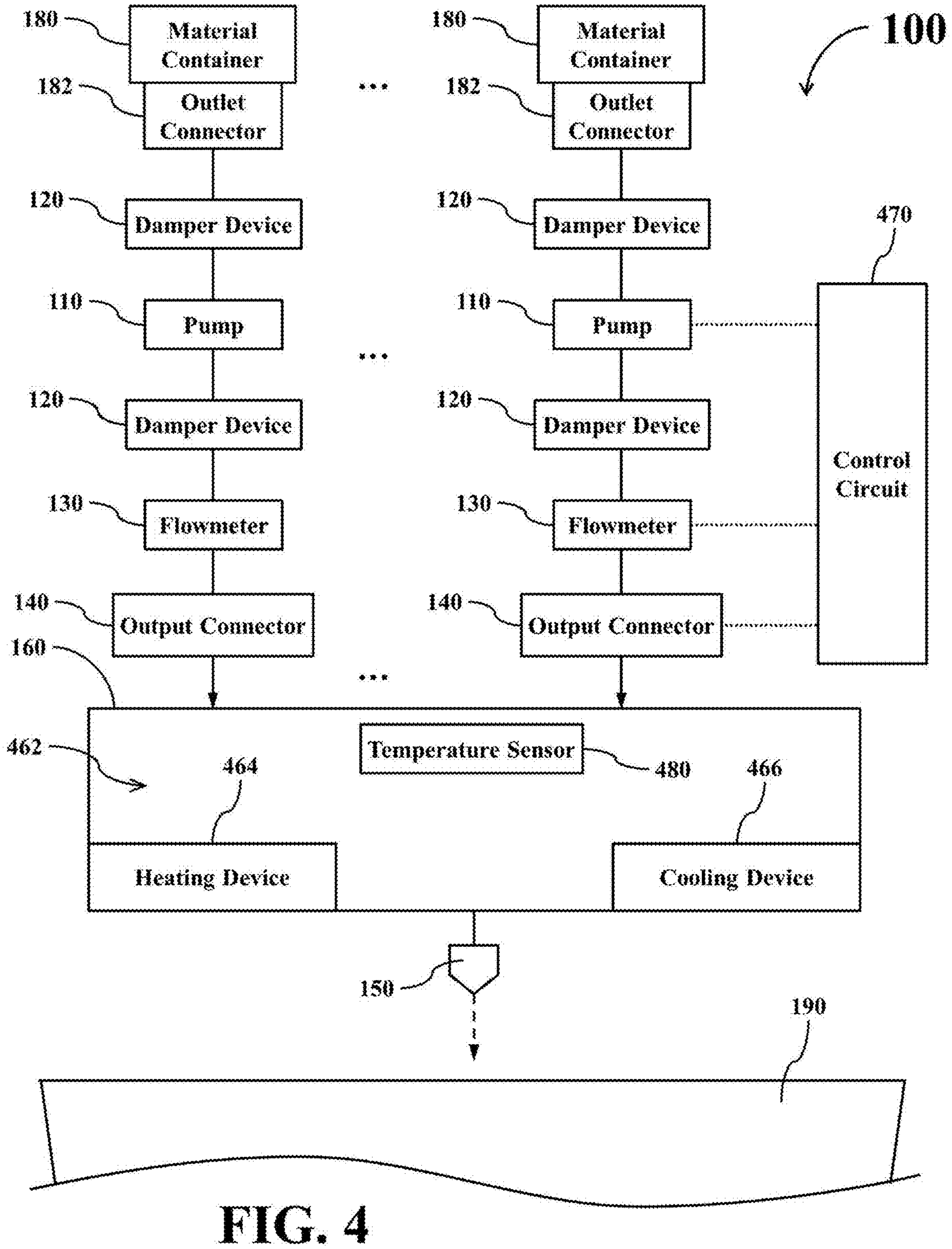
FIG. 4 shows a simplified functional block diagram of some components of the fluid material dispensing apparatus of FIG. 1 according to a first embodiment of the present disclosure.

Please refer to FIG. 4, which shows a simplified functional block diagram of some components of the fluid material dispensing apparatus 100 according to one embodiment of the present disclosure. The fluid material dispensing apparatus 100 comprises multiple material dispensing devices, which are respectively responsible for delivering the fluid materials stored in different material containers 180 to the output terminals of corresponding output connectors 140.

The operations of the multiple material dispensing devices are controlled by a control circuit 470. Each material dispensing device comprises a pump 110, one or more damper devices 120, a flowmeter 130, and a corresponding output connector 140. The pump 110, the one or more damper devices 120, the flowmeter 130, and the corresponding output connector 140 may be connected by appropriate material transmission pipes and connectors to form a material transmission channel.

In order to reduce the complexity of the drawing contents, only two exemplary material dispensing devices are shown in FIG. 4 as an example for explanation. The components and operating mechanism of each material dispensing device can be applied to other material dispensing devices in the fluid material dispensing apparatus 100.

In each material dispensing device, the pump 110 is arranged to operably push the received fluid material to flow forward. In practice, the pump 110 may be realized with various appropriate liquid pump devices capable of pushing fluid forward, such as a peristaltic pump, a diaphragm pump, a rotary diaphragm pump, or the like.

A material inlet of the pump 110 may be coupled with the outlet connector 182 of a corresponding material container 180 through appropriate connectors and material transmission pipes, and arranged to operably receive the fluid material transmitted from the corresponding material container 180 through the outlet connector 182.

The damper device 120 is arranged to operably conduct a buffering operation on the fluid material passed through the damper device 120. In some embodiments, an input terminal of the damper device 120 is coupled with a material outlet of the pump 110. In other words, the damper device 120 may be located at the subsequent stage of the pump 110. In practice, the damper device 120 may be directly connected to the material outlet of the pump 110, or may be indirectly connected to the material outlet of the pump 110 through other appropriate connectors and material transmission pipes.

During the operations of the aforementioned pump 110, the fluid material may be intermittently pushed forward, and thus the liquid pressure at the material outlet of the pump 110 exhibits periodic fluctuations. Such a situation will cause the amount of the fluid material flowing into the damper device 120 to exhibit periodic fluctuations.

When the volume of the fluid material in the damper device 120 exceeds a predetermined amount (i.e., the nominal volume of the damper device 120), a buffer chamber of the damper device 120 will temporarily deform to expand, so that the amount of the fluid material in the damper device 120 can temporarily exceed the nominal volume of the damper device 120. Over time, the clastic restoring force of the buffer chamber will push the fluid material in the damper device 120 to flow toward the output terminal of the damper device 120, so that the amount of the fluid material in the damper device 120 will drop back to a level close to its nominal volume.

The flowmeter 130 may be coupled with the output terminal of the damper device 120, and arranged to operably measure the flow of fluid material passing through the flowmeter 130. In other words, the flowmeter 130 may be located at the subsequent stage of the damper device 120. In practice, the flowmeter 130 may be directly connected to the output terminal of the damper device 120, or may be indirectly connected to the output terminal of the damper device 120 through other appropriate connectors and material transmission pipes.

As shown in FIG. 4, the temperature adjustment device 160 is coupled with the outputs of the multiple material dispensing devices of the fluid material dispensing apparatus 100, and arranged to operably receive different fluid materials transmitted from the multiple material dispensing devices to form a mixed material. From one aspect, the multiple material dispensing devices share a single temperature adjustment device 160.

The temperature sensor 480 is coupled with the control circuit 470, and arranged to operably sense and report the temperature of the mixed material within the temperature adjustment device 160 to the control circuit 470. In practice, the temperature sensor 480 may be arranged in any appropriate position inside or outside the temperature adjustment device 160. For example, the temperature sensor 480 may be attached on any appropriate position on the outer surface of the temperature adjustment device 160. For another example, the temperature sensor 480 may be slightly separated from the temperature adjustment device 160 with an appropriate spacing.

As described previously, the damper device 120 conducts a buffering treatment to the fluid material passed through the damper device 120 with the deformation and elastic restoring force of its buffer chamber. Accordingly, both the flow speed variation and the liquid pressure variation of the fluid material leaving the output terminal of the damper device 120 will be apparently lower than the flow speed variation and the liquid pressure variation of the fluid material received by the input terminal of the damper device 120. Such structure is beneficial for improving the measuring accuracy of the flowmeter 130 in measuring the flow of the fluid material passing through the flowmeter 130, thereby effectively increasing the liquid volume control accuracy of the fluid material dispensing apparatus 100 for fluid material to be dispensed.

If the aforementioned damper device 120 is omitted, both the flow speed variation and the liquid pressure variation of the fluid material passed through the flowmeter 130 will become greater. Such a situation will cause a negative impact to the measuring accuracy of the flowmeter 130 in measuring the flow of the fluid material, thereby reducing the flow measurement accuracy of the flowmeter 130.

Please note that the structure and connections between components of the material dispensing device described previously is merely an exemplary embodiment, rather than a restriction to the practical implementations of the material dispensing device.

In another embodiment, for example, the damper device 120 and the flowmeter 130 may be instead located at the prior stage of the pump 110. Specifically, the input terminal of the damper device 120 may instead be coupled with the outlet connector 182 of a corresponding material container 180 through appropriate connectors and material transmission pipes, so as to receive the fluid material transmitted from the corresponding material container 180. On the other hand, the material inlet of the pump 110 may instead be coupled with the output terminal of the flowmeter 130, so as to receive the fluid material passed through the flowmeter 130. That is, the flowmeter 130 is coupled between the damper device 120 and the pump 110 in this embodiment. In practice, the material inlet of the pump 110 may be directly connected to the output terminal of the flowmeter 130, or may be indirectly connected to the output terminal of the flowmeter 130 through appropriate connectors or material transmission pipes.

In yet another embodiment, the damper device 120 may be instead located at the prior stage of the pump 110 and the flowmeter 130 may be instead located at the prior stage of the damper device 120. Specifically, the input terminal of the flowmeter 130 is coupled with the outlet connector 182 of a corresponding material container 180, the input terminal of the damper device 120 is coupled with the output terminal of the flowmeter 130, and the material inlet of the pump 110 is coupled with the output terminal of the damper device 120.

In yet another embodiment, a first damper device 120 is coupled with the material outlet of the pump 110, while a second damper device 120 is coupled between the outlet connector 182 and the material inlet of the pump 110. That is, each material dispensing device may comprise two damper devices 120. In this embodiment, the flowmeter 130 may be coupled with the output terminal of the first damper device 120, or coupled between the output terminal of the second damper device 120 and the material inlet of the pump 110.

It can be appreciated from the foregoing elaborations, by utilizing the damper device 120 to conduct a buffering operation on the fluid material flowing therethrough, the measurement accuracy of the flowmeter 130 in measuring the flow of the fluid material outputted from the damper device 120 can be significantly improved, thereby effectively increasing the output volume control accuracy of the fluid material dispensing apparatus 100 for fluid materials to be dispensed.

Even if the fluid materials employed by the fluid material dispensing apparatus 100 are liquids having a viscosity higher than water, for example, honey, various syrups, soy milks, nut pulps, fruit juice concentrates, fruit juices containing fruit pulps, tea-based liquids containing small particles (e.g., bubbles or tapioca balls), milk-based liquids, cooking oils, or other thick fluid material (e.g., various sauces) and so on, the usage amount of corresponding fluid material can be accurately measured and manipulated by adopting the material dispensing devices described previously.

As described previously, different customers have varying preferences or needs for beverage temperature. However, traditional beverage dispensers lack the ability to flexibly adjust the temperature of beverages according to customer preferences. If a customer wants to change the temperature of the beverage, either the customer or the staff would need to add ice into or heat the beverage made by a traditional beverage dispenser. Such approaches are not only inconvenient but also make it difficult to precisely control the temperature of the resulting beverage, which may even adversely affect the taste of the resulting beverage.

In order to resolve the above problem, the fluid material dispensing apparatus 100 adopts a clever mechanism to flexibly adjust the temperature of fluid materials to be dispensed and the temperature of water to be dispensed. In this way, the fluid material dispensing apparatus 100 is enabled to flexibly adjust the temperature of resulting beverages to thereby meet different customer preferences.

As described previously, the fluid material dispensing apparatus 100 comprises multiple material dispensing devices. For the purpose of explanatory convenience in the following specification, the material dispensing device located on the right-hand side of FIG. 4 is referred to as a first material dispensing device, while another material dispensing device shown located on the left-hand side of FIG. 4 is referred to as a second material dispensing device.

As shown in FIG. 4, the first material dispensing device comprises a first pump 110, a first damper device 120, a first flowmeter 130, and a first output connector 140. Similarly, the second material dispensing device comprises a second pump 110, a second damper device 120, a second flowmeter 130, and a second output connector 140.

In this embodiment, the first pump 110 is coupled between a first outlet connector 182 of a first material container 180 and the first output connector 140, and arranged to operably extract a first fluid material from the first material container 180 and to operably push the first fluid material to flow toward the first output connector 140.

The first damper device 120 is coupled between the first pump 110 and the first output connector 140, and arranged to operably buffer the first fluid material passed through the first damper device 120.

The first flowmeter 130 is coupled between the first outlet connector 182 of the first material container 180 and the temperature adjustment device 160, and arranged to operably measure a flow of the first fluid material transmitted from the first material container 180 to the temperature adjustment device 160.

Similarly, in this embodiment, the second pump 110 is coupled between a second outlet connector 182 of a second material container 180 and the second output connector 140, and arranged to operably extract a second fluid material, which is different from the first fluid material, from the second material container 180 and to operably push the second fluid material to flow toward the second output connector 140.

The second damper device 120 is coupled between the second pump 110 and the second output connector 140, and arranged to operably buffer the second fluid material passed through the second damper device 120.

The second flowmeter 130 is coupled between the second outlet connector 182 of the second material container 180 and the temperature adjustment device 160, and arranged to operably measure a flow of the second fluid material transmitted from the second material container 180 to the temperature adjustment device 160.

As described previously, the temperature adjustment device 160 is arranged to operably receive different fluid materials through the plurality of the output connectors 140, and form a mixed material based on the received fluid materials. For example, the temperature adjustment device 160 may receive the first fluid material through the first output connector 140, receive the second fluid material through the second output connector 140, and receive other fluid materials through other output connectors 140. The temperature adjustment device 160 is further arranged to operably adjust the temperature of the mixed material within the temperature adjustment device 160, so as to produce and output a temperature-adjusted material to the nozzle 150. For example, the temperature adjustment device 160 may increase or lower the temperature of the mixed material under control of the control circuit 470.

In operation, the temperature sensor 480 may sense the temperature of the mixed material within the temperature adjustment device 160, and report the measurement result to the control circuit 470. As described previously, the temperature sensor 480 may be arranged inside or outside the temperature adjustment device 160. Accordingly, the temperature sensor 480 may be arranged to directly measure the temperature of the mixed material within the temperature adjustment device 160, or may be arranged to indirectly measure the temperature of the mixed material within the temperature adjustment device 160 based on the sensing result regarding the temperature of the outer surface of the temperature adjustment device 160.

The control circuit 470 is coupled with the first pump 110, the first flowmeter 130, the first output connector 140, the second pump 110, the second flowmeter 130, the second output connector 140, and the temperature adjustment device 160. The control circuit 470 is arranged to operably control the operations of the first pump 110, the first output connector 140, the second pump 110, the second output connector 140, and the temperature adjustment device 160, and further arranged to operably receive the measurement results from the first flowmeter 130 and the second flowmeter 130.

When the fluid material dispensing apparatus 100 does not need to dispense any fluid material to the target container 190, the control circuit 470 may turn off the plurality of output connectors 140 (e.g., the first and second output connectors 140), so that no fluid material can be transmitted to the temperature adjustment device 160. In this way, no fluid material can be dispensed to the target container 190 through the nozzle 150.

When the fluid material dispensing apparatus 100 needs to dispense both the first fluid material and the second fluid material of a predetermined temperature to the target container 190, the control circuit 470 controls the first pump 110 to operate, so that the first fluid material can be extracted from the first material container 180 and transported to the temperature adjustment device 160 through the first damper device 120, the first flowmeter 130, and the first output connector 140. Similarly, the control circuit 470 controls the second pump 110 to operate, so that the second fluid material can be extracted from the second material container 180 and transported to the temperature adjustment device 160 through the second damper device 120, the second flowmeter 130, and the second output connector 140. As described previously, the first fluid material and the second fluid material transmitted into the temperature adjustment device 160 through the first and second output connectors 140 may be passively mixed together to form a mixed material within the temperature adjustment device 160.

In addition, the control circuit 470 controls the temperature adjustment device 160 to adjust the temperature of the mixed material within the temperature adjustment device 160. In this situation, the control circuit 470 can obtain the temperature of the mixed material within the temperature adjustment device 160 according to the measurement results of the temperature sensor 480.

Afterwards, when the control circuit 470 determines that the temperature of the mixed material within the temperature adjustment device 160 reaches the predetermined temperature, the control circuit 470 turns on the nozzle 150 (or a switch device coupled between the temperature adjustment device 160 and the nozzle 150), so that the nozzle 150 can output the temperature-adjusted material to the target container 190.

In the embodiment of FIG. 4, the temperature adjustment device 160 comprises an adjustment chamber 462, a heating device 464, and a cooling device 466. The adjustment chamber 462 is coupled with the output terminals of the plurality of output connectors 140 through various material transmission pipes and connectors, and also coupled with the nozzle 150. The adjustment chamber 462 is arranged to operably receive different fluid materials through different output connectors 140, so that a mixed material can be formed within the adjustment chamber 462. For example, the adjustment chamber 462 may receive the first fluid material through the first output connector 140, and receive the second fluid material through the second output connector 140.

The heating device 464 is coupled with the control circuit 470, and arranged to operably heat the mixed material within the adjustment chamber 462 under control of the control circuit 470. The cooling device 466 is coupled with the control circuit 470, and arranged to operably cool the mixed material within the adjustment chamber 462 under control of the control circuit 470.

That is, the control circuit 470 may control the heating device 464 and/or the cooling device 466 to adjust the temperature of the mixed material within the adjustment chamber 462, so as to produce a temperature-adjusted material within the adjustment chamber 462.

In this situation, the temperature sensor 480 may be placed in any appropriate position inside or outside the temperature adjustment device 160, and arranged to operably sense and report the temperature of the mixed material within the adjustment chamber 462 to the control circuit 470.

In practice, the heating device 464 may be arranged inside the adjustment chamber 462, may be attached on the outer surface of the adjustment chamber 462, may surround at least a portion of the outer surface of the adjustment chamber 462, or may be slightly separated from the adjustment chamber 462 with an appropriate spacing. Similarly, the cooling device 466 may be arranged inside the adjustment chamber 462, may be attached on the outer surface of the adjustment chamber 462, may surround at least a portion of the outer surface of the adjustment chamber 462, or may be slightly separated from the adjustment chamber 462 with an appropriate spacing.

For example, in the embodiment of FIG. 4, the heating device 464 and the cooling device 466 are both arranged inside the adjustment chamber 462. The heating device 464 and the cooling device 466 may be attached to or positioned close to the bottom of the adjustment chamber 462. The positions of the heating device 464 and the cooling device 466 are separated from each other, and an appropriate insulation zone or insulation device may be arranged between the heating device 464 and the cooling device 466.

In practice, the heating device 464 may be realized with various appropriate heater apparatuses capable of increasing the temperature of the mixed material within the adjustment chamber 462, such as various thermoelectric chips, hot water pipelines, electrical heaters, gas heaters, or the like.

The cooling device 466 may be realized with various appropriate cooler apparatuses capable of lowering the temperature of the mixed material within the adjustment chamber 462, such as various thermoelectric cooling chips, Peltier coolers, Peltier cells, cold water pipelines, heat sinks, or the like.

Accordingly, the disclosed fluid material dispensing apparatus 100 is capable of accurately controlling the material output volume of respective fluid materials, and thus it is able to maintain the taste consistency of resulting freshly made beverages.

In addition, the disclosed fluid material dispensing apparatus 100 utilizes the temperature adjustment device 160 to flexibly adjust the temperature of the mixed material to be dispensed, and thus it is able to flexibly adjust the temperature of resulting freshly made beverages. In this way, the fluid material dispensing apparatus 100 is able to meet different customer preferences.

Furthermore, the disclosed fluid material dispensing apparatus 100 is able to operate based on the parameters configured by the user to automatically utilize multiple material dispensing devices to output extracted fluid materials to the temperature adjustment device 160, and to automatically utilize the temperature adjustment device 160 to produce and output a temperature-adjusted material to the target container 190 through the nozzle 150, so as to achieve the automatic preparation of freshly made beverages. Therefore, the disclosed fluid material dispensing apparatus 100 not only effectively reduces the time and costs required for personnel training, but also significantly reduces the labor time required for the preparation of the freshly made beverages.

Figure 5:
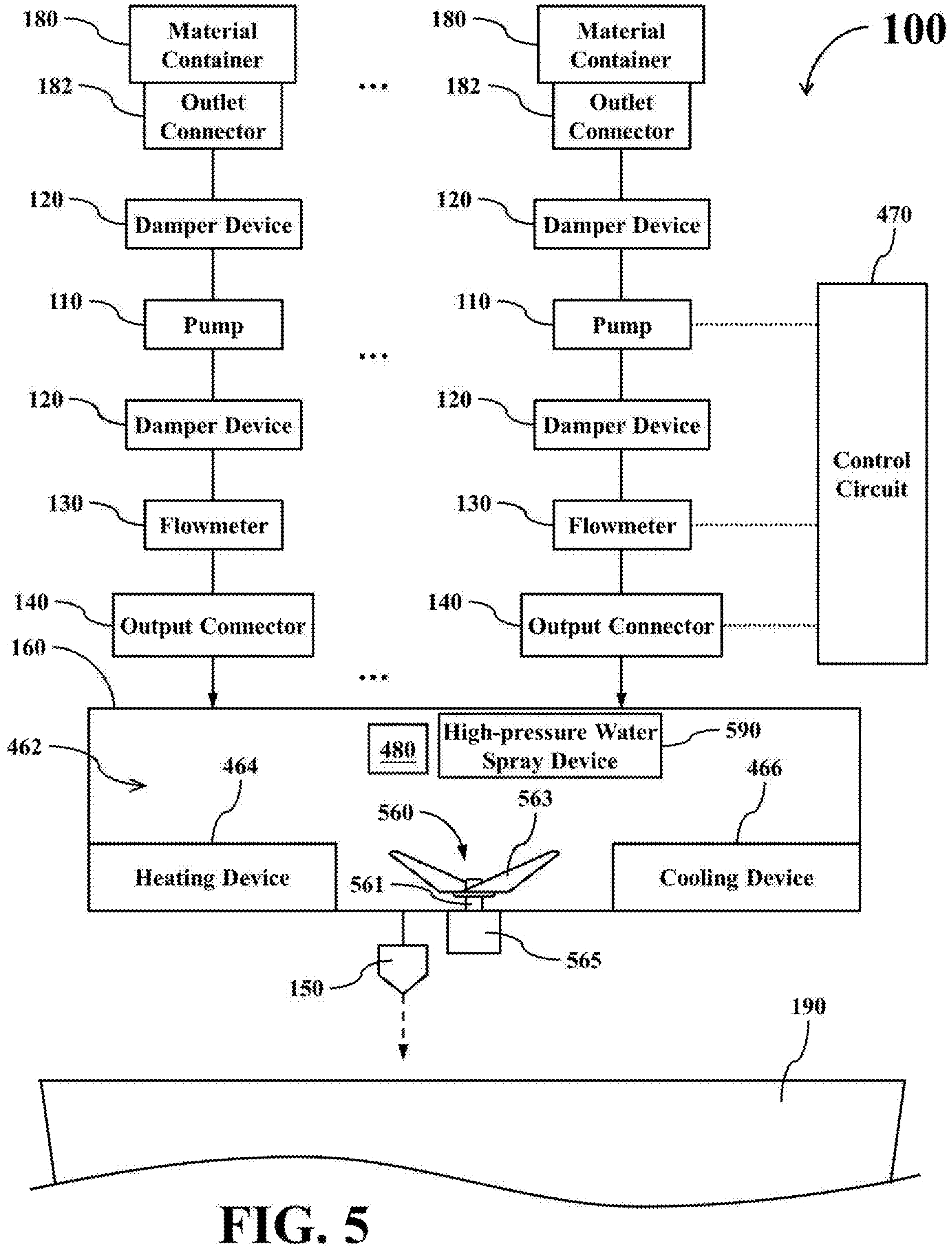
FIG. 5 shows a simplified functional block diagram of some components of the fluid material dispensing apparatus of FIG. 1 according to a second embodiment of the present disclosure.

Please refer to FIG. 5, which shows a simplified functional block diagram of some components of the fluid material dispensing apparatus 100 according to another embodiment of the present disclosure. In the embodiment of FIG. 5, the temperature adjustment device 160 of the fluid material dispensing apparatus 100 further comprises a blending device 560 and a high-pressure water spray device 590.

The blending device 560 is coupled with the control circuit 470, and arranged to operably blend different fluid materials transmitted from the plurality of output connectors 140 to form a mixed material within the adjustment chamber 462. For example, the blending device 560 may be arranged to actively blend the first fluid material transmitted from the first output connector 140 with the second fluid material transmitted from the second output connector 140 under control of the control circuit 470 to form the mixed material.

The blending device 560 may comprise a rotating shaft 561, one or more rotatable elements 563, and a motor 565. The rotating shaft 561 is coupled with the motor 565, and the one or more rotatable elements 563 are coupled with the rotating shaft 561. The motor 565 is coupled with the control circuit 470, and arranged to operate under control of the control circuit 470.

The control circuit 470 may control the motor 565 to drive the rotating shaft 561 to rotate. Since the one or more rotatable elements 563 are coupled with the rotating shaft 561, when the rotating shaft 561 rotates, the one or more rotatable elements 563 are driven by the rotating shaft 561 to rotate correspondingly, so as to blend different fluid materials within the adjustment chamber 462 to form the mixed material.

By utilizing the blending device 560, different fluid materials within the adjustment chamber 462 can be mixed more uniformly and quickly.

In operation, the control circuit 470 may control the blending device 560 to begin the blending operation before the temperature adjustment device 160 adjusts the temperature of the fluid materials within the adjustment chamber 462, or to begin the blending operation during the temperature adjustment device 160 adjusting the temperature of the fluid materials within the adjustment chamber 462. That is, the blending device 560 may blend different fluid materials within the adjustment chamber 462 to form the mixed material before the temperature adjustment device 160 adjusts the temperature of those materials, or during the temperature adjustment device 160 adjusting the temperature of those fluid materials.

When the different fluid materials within the adjustment chamber 462 are blended together to form a mixed material (e.g., after the blending device 560 blends the different fluid materials within the adjustment chamber 462 for a predetermined time), the control circuit 470 may control the motor 565 to stop operation, so as to complete the blending operation of the blending device 560.

Afterwards, when the control circuit 470 determines that the temperature of the mixed material within the adjustment chamber 462 reaches a predetermined temperature based on the measurement results of the temperature sensor 480, the control circuit 470 will turn on the nozzle 150 (or turn on a switch device coupled between the temperature adjustment device 160 and the nozzle 150), so that a temperature-adjusted material at a desired temperature within the adjustment chamber 462 can be dispensed into the target container 190 through the nozzle 150.

It can be appreciated from the foregoing descriptions that the blending device 560 may complete the blending operation before the temperature-adjusted material is dispensed to the target container 190 through the nozzle 150.

In practice, each of the one or more rotatable elements 563 may be designed to have any appropriate appearance, such as a blade-like shape, a rod-like shape, a zigzag shape, or the like. The motor 565 may be located inside the adjustment chamber 462, partially inside the adjustment chamber 462, or outside the adjustment chamber 462, and may be realized with various appropriate motors, such as a DC motor, a stepper motor, a brushless DC motor, a servo motor, or the like.

In FIG. 5, the high-pressure water spray device 590 is coupled with the control circuit 470, and arranged to operably spray high-pressure water to the inner surface of the adjustment chamber 462. The high-pressure water spray device 590 may be coupled with an appropriate water source to receive required water, and then convert or compress the received water to be high-pressure water. In practice, the high-pressure water spray device 590 may be realized with any appropriate device capable of spraying high-pressure water to the inner surface of the adjustment chamber 462.

After the fluid material dispensing apparatus 100 completes the fluid material dispensing operation, the user may take away the target container 190 containing the mixed material at a desired temperature. However, a small amount of residual material may remain on the inner surface of the adjustment chamber 462. If the residual material is not removed from the adjustment chamber 462, the residual material may mix with other fluid materials delivered from those material dispensing devices during the next round of fluid material dispensing operation. As a result, the flavor of the mixed material within the adjustment chamber 462 may be adversely affected in the next round of fluid material dispensing operation.

In order to remove the residual material from the adjustment chamber 462, the control circuit 470 of FIG. 5 may control the high-pressure water spray device 590 to output high-pressure water to rinse the inner surface of the adjustment chamber 462 after the fluid material dispensing apparatus 100 completes the fluid material dispensing operation (e.g., after the user takes away the target container 190), so that the residual material on the inner surface of the adjustment chamber 462 can be flushed away from the inner surface of the adjustment chamber 462.

In one embodiment, after the high-pressure water spray device 590 utilizes the high-pressure water to rinse the inner surface of the adjustment chamber 462 for a certain time, the control circuit 470 may control the high-pressure water spray device 590 to stop operation. Then, the control circuit 470 will turn on the nozzle 150 (or turn on a switch device coupled between the temperature adjustment device 160 and the nozzle 150), so as to discharge residual material and waste water within the adjustment chamber 462 to outside the adjustment chamber 462 through the nozzle 150.

In another embodiment, the control circuit 470 turns on the nozzle 150 (or turns on a switch device coupled between the temperature adjustment device 160 and the nozzle 150) during the high-pressure water spray device 590 rinsing the inner surface of the adjustment chamber 462 with the high-pressure water. In this situation, residual material within the adjustment chamber 462 and waste water can be discharged to outside the adjustment chamber 462 through the nozzle 150 during the operation of the high-pressure water spray device 590.

In practice, the user may place an appropriate container (e.g., a cup, a bowl, a pot, a water ladle, or the like) on an appropriate position beneath the nozzle 150 to receive the residual material and waste water discharged from the nozzle 150.

Alternatively, the fluid material dispensing apparatus 100 may further comprise a drain pan or a drainage sink. The drain pan or the drainage sink may be arranged on an appropriate position beneath the nozzle 150. In this situation, the nozzle 150 may discharge the residual material and waste water to the drain pan or the drainage sink, so that the user does not need to manually place a container beneath the nozzle 150 to receive the residual material and waste water discharged from the nozzle 150.

It can be appreciated from the foregoing descriptions that the residual material within the adjustment chamber 462 can be flushed away from the inner surface of the adjustment chamber 462 and discharged to outside the adjustment chamber 462 by utilizing the high-pressure water spray device 590 to spray high-pressure water to rinse the inner surface of the adjustment chamber 462. In other words, the high-pressure water spray device 590 can be utilized to achieve an automatic cleaning operation to the adjustment chamber 462 under control of the control circuit 470.

After discharging the residual material and waste water to outside the adjustment chamber 462, the temperature adjustment device 160 can be utilized for the next round of fluid material dispensing operation or beverage making operation. From one aspect, the high-pressure water spray device 590 can prevent the flavor of the mixed material in the next round of fluid material dispensing operation from being adversely affected by the residual material within the adjustment chamber 462.

Please note that the foregoing descriptions regarding the implementations, connections, operations, and related advantages of other corresponding functional blocks of the fluid material dispensing apparatus 100 in FIG. 4 are also applicable to the embodiment of FIG. 5.

Figure 6:
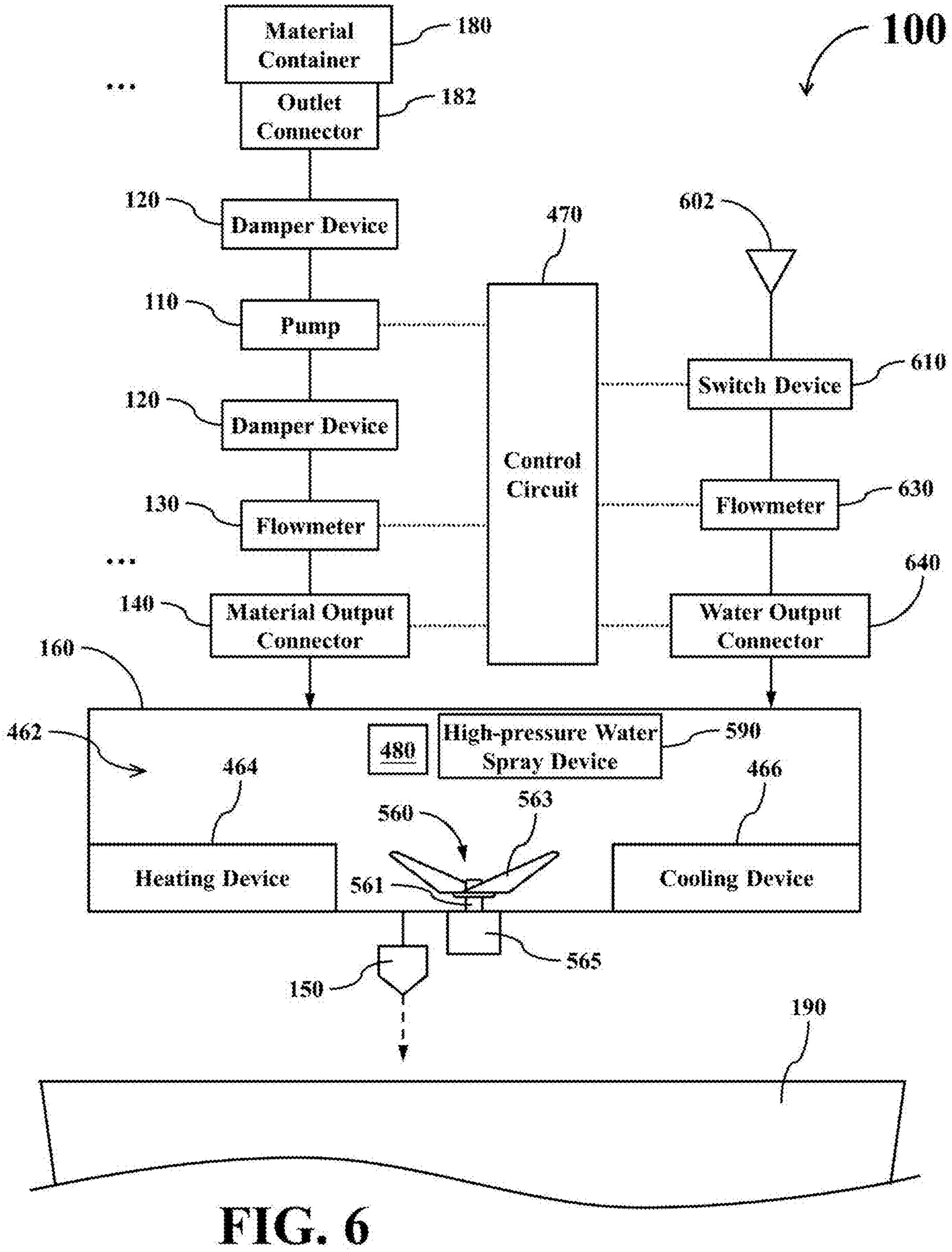
FIG. 6 shows a simplified functional block diagram of some components of the fluid material dispensing apparatus of FIG. 1 according to a third embodiment of the present disclosure.

Please refer to FIG. 6, which shows a simplified functional block diagram of the fluid material dispensing apparatus 100 according to another embodiment of the present disclosure. As shown in FIG. 6, in addition to the multiple material dispensing devices described previously, the fluid material dispensing apparatus 100 may further comprise one or more water dispensing devices for delivering water to the temperature adjustment device 160. In practice, different water dispensing devices may be respectively utilized to deliver water of different temperatures to the temperature adjustment device 160. That is, the temperature of the water delivered by a specific water dispensing device may differ from the temperature of the water delivered by another water dispensing device.

The operations of the water dispensing devices are controlled by the control circuit 470. As shown in FIG. 6, each water dispensing device comprises a water input port 602, a switch device 610, a flowmeter 630, and a corresponding output connector 640. The water input port 602, the switch device 610, the flowmeter 630, and the output connector 640 may be connected by appropriate material transmission pipes and connectors to form a water transmission channel.

The water input port 602 is arranged to operably receive water (e.g., drinking water in this embodiment) from an outside environment of the fluid material dispensing apparatus 100, such as a water tap, an external water supply device, or a water filtering device.

The switch device 610 is coupled with the water input port 602, and arranged to operably control whether the water can be transmitted toward the temperature adjustment device 160. In practice, the switch device 610 may be realized with various appropriate water gating devices, check valves, solenoid valves, or the like.

The flowmeter 630 is coupled between the water input port 602 and the temperature adjustment device 160, and arranged to operably measure a flow of water to be dispensed to the temperature adjustment device 160. For example, the flowmeter 630 may be coupled between the water input port 602 and the switch device 610, between the switch device 610 and the output connector 640, or between the output connector 640 and the temperature adjustment device 160.

The output connector 640 is coupled with the temperature adjustment device 160, and arranged to operably control whether the water can be transmitted into the temperature adjustment device 160. The output connector 640 may be connected to other components through various suitable material transmission pipes and connectors to increase the selection flexibility of the position of the output connector 640. For example, the input terminal of the output connector 640 may be connected to the output terminal of the switch device 610 (or the output terminal of the flowmeter 630) through various suitable material transmission pipes and connectors. The output connector 640 is similar to the aforementioned output connector 140, and may be realized with one of the aforementioned output connectors 140, or various appropriate connectors, water gating devices, check valves, solenoid valves, or the like.

For illustrative purposes, in FIG. 6 and subsequent drawings, the output connector 140 used in the material dispensing device will be referred to as the material output connector 140, and the output connector 640 used in the water dispensing device will be referred to as the water output connector 640.

In order to reduce the complexity of the drawing contents, only one exemplary material dispensing device and one exemplary water dispensing device are shown in FIG. 6 as an example for explanation, and other structures and devices of the fluid material dispensing apparatus 100 are not shown in FIG. 6.

The material dispensing device shown in FIG. 6 is identical to the material dispensing device shown in FIG. 5. Accordingly, the foregoing descriptions regarding the implementations, connections, operations, and related advantages of other corresponding functional blocks of the material dispensing devices in FIG. 5 are also applicable to the embodiment of FIG. 6.

As described previously, the temperature adjustment device 160 is coupled with the material output connectors 140 of the multiple material dispensing devices, and arranged to operably receive different fluid materials passed through different material output connectors 140. In the embodiment of FIG. 6, the temperature adjustment device 160 is also coupled with the water output connectors 640 of the one or more water dispensing devices, and arranged to operably receive the water passed through the water output connectors 640. As described previously, different water output connectors 640 may be respectively utilized to deliver water of different temperatures to the temperature adjustment device 160.

The temperature adjustment device 160 of FIG. 6 is further arranged to operably form a mixed material within the adjustment chamber 462 based on the fluid materials passed through the material output connectors 140 and the water passed through the water output connectors 640.

Similar to the previous embodiments, the control circuit 470 of FIG. 6 is arranged to operably control the temperature adjustment device 160 to adjust the temperature of the mixed material within the adjustment chamber 462 to produce and output a temperature-adjusted material to the nozzle 150, so that the nozzle 150 can output the temperature-adjusted material to the target container 190.

In operation, the temperature sensor 480 may sense the temperature of the mixed material within the adjustment chamber 462, and report the measurement result to the control circuit 470. As described previously, the temperature sensor 480 may be arranged to directly measure the temperature of the mixed material within the adjustment chamber 462, or may be arranged to indirectly measure the temperature of the mixed material within the adjustment chamber 462 based on the sensing result regarding the temperature of the outer surface of the adjustment chamber 462.

As shown in FIG. 6, the control circuit 470 is also coupled with the switch device 610, the flowmeter 630, and the water output connector 640. The control circuit 470 is arranged to operably control the operations of the switch device 610 and the water output connector 640, and further arranged to operably receive the measurement results from the flowmeter 630.

When the fluid material dispensing apparatus 100 of FIG. 6 does not need to dispense any fluid material and water to the target container 190, the control circuit 470 may turn off all material output connectors 140 and all water output connectors 640, so that no fluid material and water can be transmitted to the temperature adjustment device 160. In this way, no fluid material and water can be dispensed to the target container 190 through the nozzle 150.

When the fluid material dispensing apparatus 100 of FIG. 6 needs to dispense certain fluid materials and water to the target container 190, the control circuit 470 may control related pumps 110 to operate, so that required fluid materials can be extracted from related material containers 180 and transported to the adjustment chamber 462 of the temperature adjustment device 160 through related material transmission channels. On the other hand, the control circuit 470 may turn on the switch device 610 and the water output connector 640 of a related water dispensing device, so that water of a target temperature can be transported to the adjustment chamber 462 of the temperature adjustment device 160 through the water output connector 640.

The fluid materials and water transmitted into the adjustment chamber 462 of the temperature adjustment device 160 through related material output connectors 140 and related water output connector 640 may be passively mixed together to form a mixed material within the adjustment chamber 462.

Similar to the previous embodiments, the control circuit 470 may control the temperature adjustment device 160 to adjust the temperature of the mixed material within the temperature adjustment device 160. For example, the control circuit 470 may control the heating device 464 to increase the temperature of the mixed material, or may control the cooling device 466 to lower the temperature of the mixed material. The control circuit 470 can obtain the temperature of the mixed material within the temperature adjustment device 160 according to the measurement results of the temperature sensor 480.

Afterwards, when the control circuit 470 determines that the temperature of the mixed material within the temperature adjustment device 160 reaches a predetermined temperature, the control circuit 470 turns on the nozzle 150 (or a switch device coupled between the temperature adjustment device 160 and the nozzle 150), so that the nozzle 150 can output the temperature-adjusted material to the target container 190.

In the embodiment of FIG. 6, the control circuit 470 may control the blending device 560 to actively blend the fluid materials transmitted from related material output connectors 140 with the water transmitted from the related water output connector 640 to form the mixed material. By utilizing the blending device 560, the fluid materials and water within the adjustment chamber 462 can be mixed more uniformly and quickly.

In operation, the control circuit 470 may control the blending device 560 to begin the blending operation before the temperature adjustment device 160 adjusts the temperature of the fluid materials and water within the adjustment chamber 462, or to begin the blending operation during the temperature adjustment device 160 adjusting the temperature of the fluid materials and water within the adjustment chamber 462. That is, the blending device 560 may blend the fluid materials and water within the adjustment chamber 462 to form the mixed material before the temperature adjustment device 160 adjusts the temperature of those materials, or during the temperature adjustment device 160 adjusting the temperature of those materials.

When the fluid materials and water within the adjustment chamber 462 are blended together to form a mixed material (e.g., after the blending device 560 blends the fluid materials and water within the adjustment chamber 462 for a predetermined time), the control circuit 470 may control the motor 565 to stop operation, so as to complete the blending operation of the blending device 560.

Afterwards, when the control circuit 470 determines that the temperature of the mixed material within the adjustment chamber 462 reaches a predetermined temperature based on the measurement results of the temperature sensor 480, the control circuit 470 will turn on the nozzle 150 (or turn on a switch device coupled between the temperature adjustment device 160 and the nozzle 150), so that a temperature-adjusted material at a desired temperature within the adjustment chamber 462 can be dispensed into the target container 190 through the nozzle 150.

It can be appreciated from the foregoing descriptions that the blending device 560 may complete the blending operation before the temperature-adjusted material is dispensed to the target container 190.

Similar to the previous embodiments, the high-pressure water spray device 590 of FIG. 6 is arranged to operably spray high-pressure water to the inner surface of the adjustment chamber 462 under control of the control circuit 470. The high-pressure water spray device 590 may be coupled with an appropriate water source to receive required water, and then convert or compress the received water to be high-pressure water. In the embodiment of FIG. 6, for example, the high-pressure water spray device 590 may be coupled with the water output connectors 640 of the one or more water dispensing devices, so as to receive water from related water output connectors 640.

The water supplied from the water output connector 640 to the adjustment chamber 462 may be divided into two parts in the adjustment chamber 462. The first part, which is 80%~90% of the total volume of the water passed through the water output connector 640, is used in forming the aforementioned mixed material. The second part, which is 10%~20% of the total volume of the water passed through the water output connector 640, is reserved for the high-pressure water spray device 590 to produce the high-pressure water. That is, the high-pressure water spray device 590 may use 10%~20% of the total volume of the water transmitted from the water output connector 640 to the adjustment chamber 462 to produce the high-pressure water. In another embodiment, the volume of the second part of water that is reserved for the high-pressure water spray device 590 to produce the high-pressure water may range from 20 milliliters to 150 milliliters. That is, the volume of the high-pressure water produced by the high-pressure water spray device 590 may range from 20 milliliters to 150 milliliters.

As mentioned above, a small amount of residual material may remain on the inner surface of the adjustment chamber 462. If the residual material is not removed from the adjustment chamber 462, the residual material may mix with other fluid materials delivered from those material dispensing devices during the next round of fluid material dispensing operation. As a result, the flavor of the mixed material within the adjustment chamber 462 may be adversely affected in the next round of fluid material dispensing operation.

In the embodiment of FIG. 6, the control circuit 470 may control the high-pressure water spray device 590 to spray a predetermined volume of high-pressure water to rinse the inner surface of the adjustment chamber 462 during the final stage (e.g., the last 2~5 seconds) of dispensing the temperature-adjusted material to the target container 190 through the nozzle 150, so that the residual material on the inner surface of the adjustment chamber 462 can be flushed away from the inner surface of the adjustment chamber 462. As described previously, the predetermined volume may range from 20 milliliters to 150 milliliters, or may be 10%~20% of the total volume of the water passed through the water output connector 640.

In this situation, the residual material on the inner surface of the adjustment chamber 462 will be flushed away from the inner surface of the adjustment chamber 462, and then dispensed to the target container 190 through the nozzle 150 along with the water outputted from high-pressure water spray device 590. That is, in the embodiment of FIG. 6, the high-pressure water outputted by the high-pressure water spray device 590 will become part of the water to be dispensed to the target container 190.

In other words, both the high-pressure water outputted by the high-pressure water spray device 590 and the residual material will be dispensed into the target container 190 through the nozzle 150 to become part of the mixed material in the embodiment of FIG. 6.

Accordingly, the user does not need to manually place a container beneath the nozzle 150 to receive the residual material and waste water discharged from the nozzle 150, and there is no need for the fluid material dispensing apparatus 100 to arrange a drain pan or a drainage sink beneath the nozzle 150.

It can be appreciated from the foregoing descriptions that the residual material within the adjustment chamber 462 can be flushed away from the inner surface of the adjustment chamber 462 and dispensed to the target container 190 through the nozzle 150 along with the water outputted from high-pressure water spray device 590. After the fluid material dispensing apparatus 100 completes the fluid material dispensing operation, the temperature adjustment device 160 can be utilized for the next round of fluid material dispensing operation or beverage making operation.

In one aspect, the high-pressure water spray device 590 can be utilized to achieve an automatic cleaning operation to the adjustment chamber 462 under control of the control circuit 470.

From another aspect, the high-pressure water spray device 590 can prevent the flavor of the mixed material in the next round of fluid material dispensing operation from being adversely affected by the residual material within the adjustment chamber 462.

Additionally, no material and water will be wasted by adopting the architecture of the fluid material dispensing apparatus 100 of FIG. 6.

Please note that the foregoing descriptions regarding the implementations, connections, operations, and related advantages of other corresponding functional blocks of the fluid material dispensing apparatus 100 in FIG. 4 and FIG. 5 are also applicable to the embodiment of FIG. 6.

In some embodiments where the fluid material dispensing apparatus 100 is utilized as an automated beverage preparation apparatus, a user may place a target container 190 on an appropriate position beneath the aforementioned multiple nozzle 150 and manipulate the control panel 109 to configure one or more production parameters for the required freshly made beverages, such as beverage item, cup size, beverage volume, sugar level, ice level, and/or quantity of cups, or the like.

Then, the material dispensing devices of the fluid material dispensing apparatus 100 would operate based on the parameters configured by the user to automatically utilize one or more pumps 110 to extract required fluid materials from one or more material containers 180, and to transmit the extracted fluid materials toward the temperature adjustment device 160 through respective transmission pipes. With the continuous operation of the respective pump, related fluid materials will be delivered to the temperature adjustment device 160 through related material output connectors 140.

If necessary, the water dispensing device of the fluid material dispensing apparatus 100 would operate based on the parameters configured by the user to deliver a required amount of water to the temperature adjustment device 160 through related water output connectors 640.

The control circuit 470 may control the temperature adjustment device 160 to adjust the temperature of the fluid materials (or fluid materials plus water) within the temperature adjustment device 160, so as to produce and output a temperature-adjusted beverage to the target container 190 through the nozzle 150.

Freshly made beverages of a variety of flavors can be obtained by mixing different fluid materials together in the target container 190 according to a particular ratio, or by simple stirring after mixing the fluid materials. In practice, the target container 190 may be designed to support or have a blending functionality to increase the speed and uniformity of mixing the fluid materials.

In the embodiment where the fluid material dispensing apparatus 100 is utilized as a sauce dispensing apparatus, the user may place the target container 190 on an appropriate position beneath the aforementioned multiple nozzle 150 and manipulate the control panel 109 to configure species and output amount of related sauce to be dispensed.

Similarly, the material dispensing devices of the fluid material dispensing apparatus 100 would operate based on the parameters configured by the user to automatically utilize one or more pumps 110 to extract required fluid materials from one or more material containers 180, and to transmit the extracted fluid materials toward the temperature adjustment device 160 through respective transmission pipes. With the continuous operation of the respective pump, related fluid materials will be delivered to the temperature adjustment device 160 through related material output connectors 140.

If necessary, the water dispensing device of the fluid material dispensing apparatus 100 would operate based on the parameters configured by the user to deliver a required amount of water to the temperature adjustment device 160 through related water output connectors 640.

The control circuit 470 may control the temperature adjustment device 160 to adjust the temperature of the fluid materials (or fluid materials plus water) within the temperature adjustment device 160, so as to produce and output a temperature-adjusted sauce to the target container 190 through the nozzle 150.

Accordingly, the disclosed fluid material dispensing apparatus 100 is capable of accurately controlling the material output volume of respective fluid materials, and thus it is able to maintain the taste consistency of resulting freshly made beverages.

In addition, the disclosed fluid material dispensing apparatus 100 is capable of flexibly adjusting the temperature of fluid materials to be dispensed, and also capable of flexibly adjusting the temperature of water to be dispensed. Accordingly, the disclosed fluid material dispensing apparatus 100 is able to flexibly adjust the temperature of resulting freshly made beverages. In this way, the fluid material dispensing apparatus 100 is able to meet different customer preferences.

Furthermore, the disclosed fluid material dispensing apparatus 100 is able to operate based on the parameters configured by the user to automatically utilize multiple material dispensing devices to output extracted fluid materials to the target container 190 through nozzle 150, and to automatically utilize the water dispensing device to output water with desired temperature and volume to the target container 190 through the nozzle 150, so as to achieve the automatic preparation of freshly made beverages. Therefore, the disclosed fluid material dispensing apparatus 100 not only effectively reduces the time and cost required for personnel training, but also significantly reduces the labor time required for the preparation of the freshly made beverages.

Please note that the component structure and connections between components of the fluid material dispensing apparatus 100 in the aforementioned FIG. 4 through FIG. 6 are merely exemplary embodiments, rather than a restriction to the practical implementations of the fluid material dispensing apparatus 100.

Figure 7:
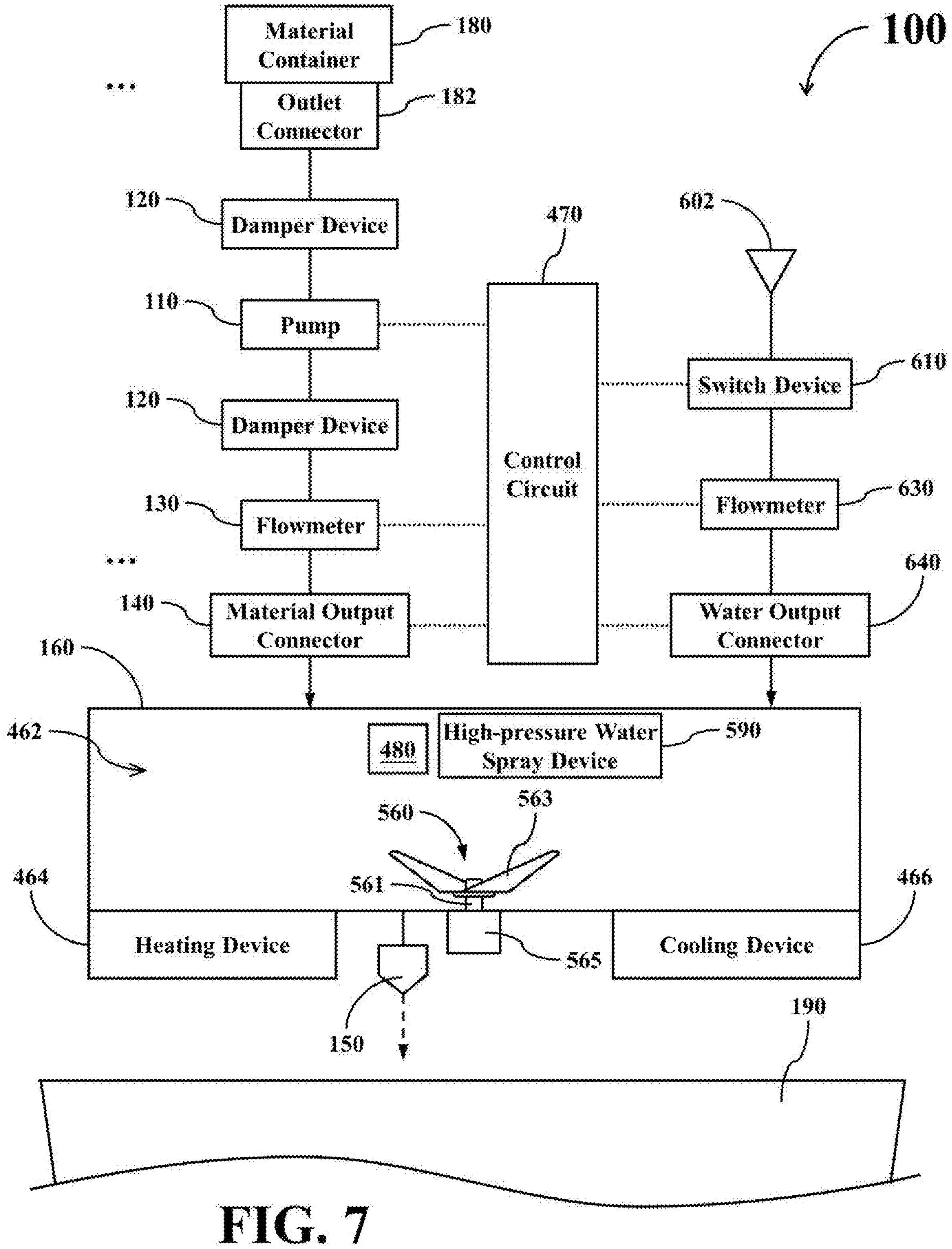
FIG. 7 shows a simplified functional block diagram of some components of the fluid material dispensing apparatus of FIG. 1 according to a fourth embodiment of the present disclosure.

For example, in the embodiment of FIG. 7, the heating device 464 and the cooling device 466 are both arranged beneath the adjustment chamber 462, and are both attached to or positioned close to the outer surface of the adjustment chamber 462. That is, the heating device 464 and the cooling device 466 are both positioned outside the adjustment chamber 462. The positions of the heating device 464 and the cooling device 466 are separated from each other, and an appropriate insulation zone or insulation device may be arranged between the heating device 464 and the cooling device 466.

Figure 8:
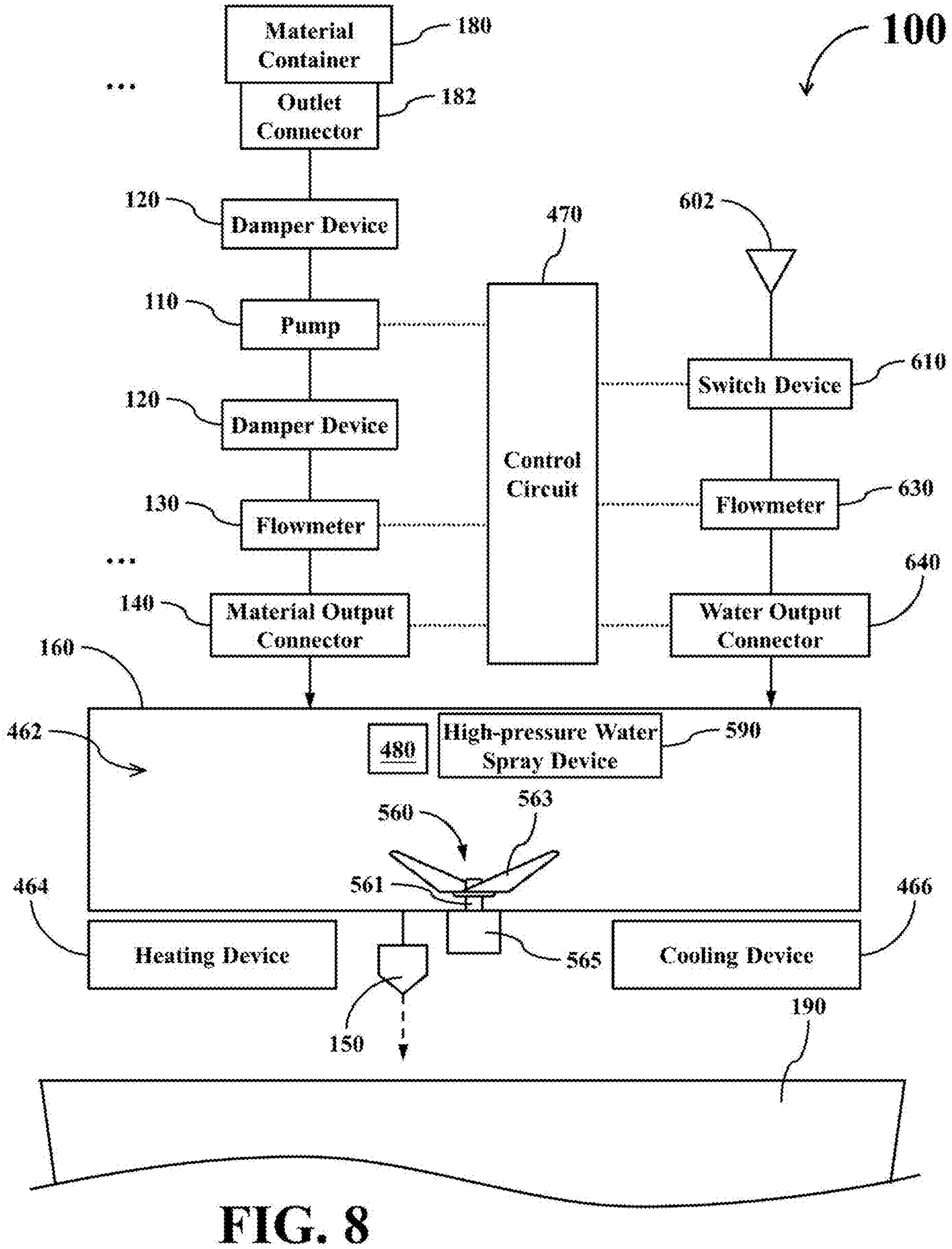
FIG. 8 shows a simplified functional block diagram of some components of the fluid material dispensing apparatus of FIG. 1 according to a fifth embodiment of the present disclosure.

For another example, in the embodiment of FIG. 8, the heating device 464 and the cooling device 466 are both arranged beneath the adjustment chamber 462, and are slightly separated from the outer surface of the adjustment chamber 462 with an appropriate spacing. Similarly, the positions of the heating device 464 and the cooling device 466 are separated from each other, and an appropriate insulation zone or insulation device may be arranged between the heating device 464 and the cooling device 466.

Figure 9:
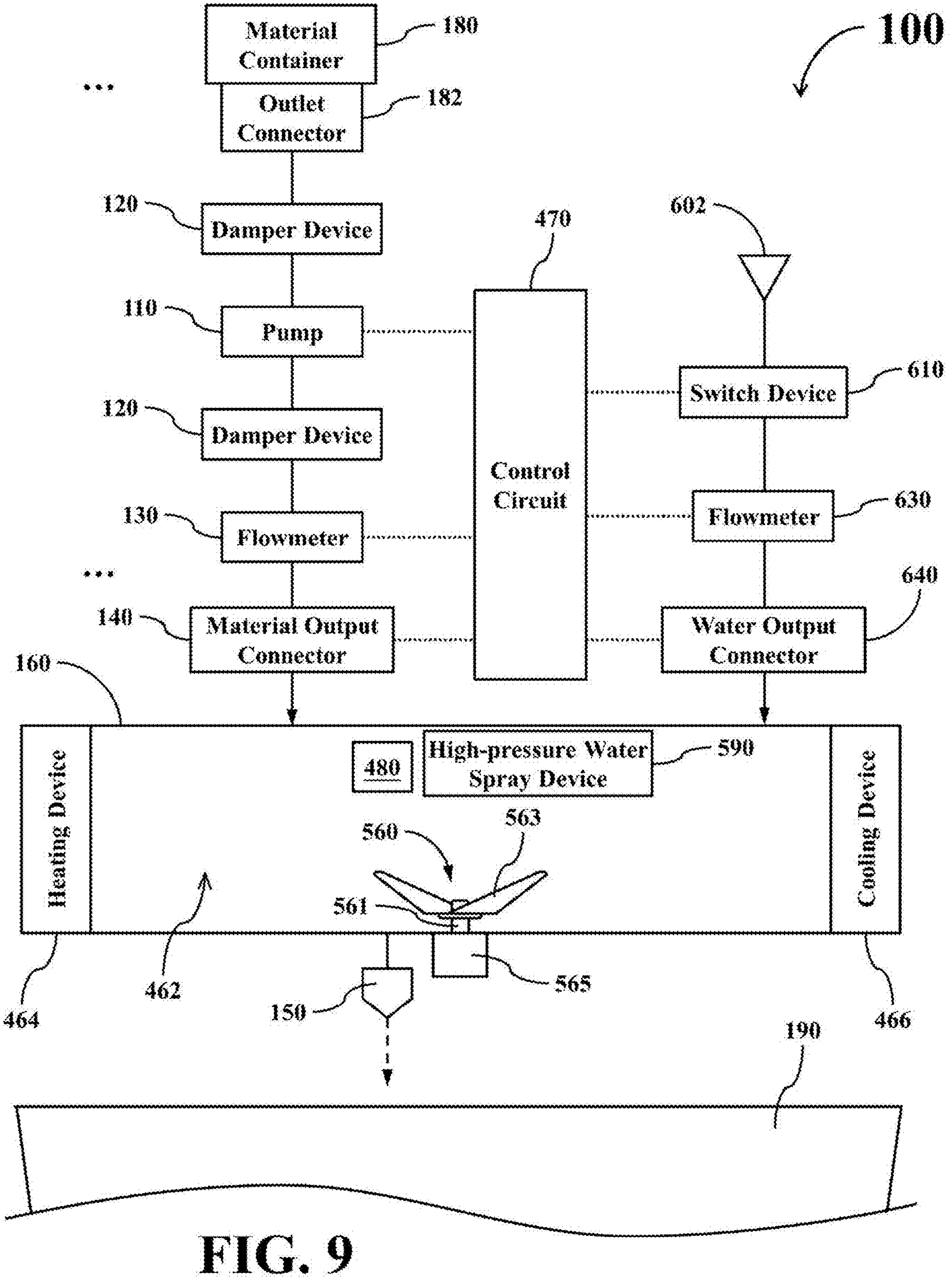
FIG. 9 shows a simplified functional block diagram of some components of the fluid material dispensing apparatus of FIG. 1 according to a sixth embodiment of the present disclosure.

For yet another example, in the embodiment of FIG. 9, the heating device 464 and the cooling device 466 are both arranged outside the adjustment chamber 462, and are located on opposite sides of the adjustment chamber 462.

Figure 10:
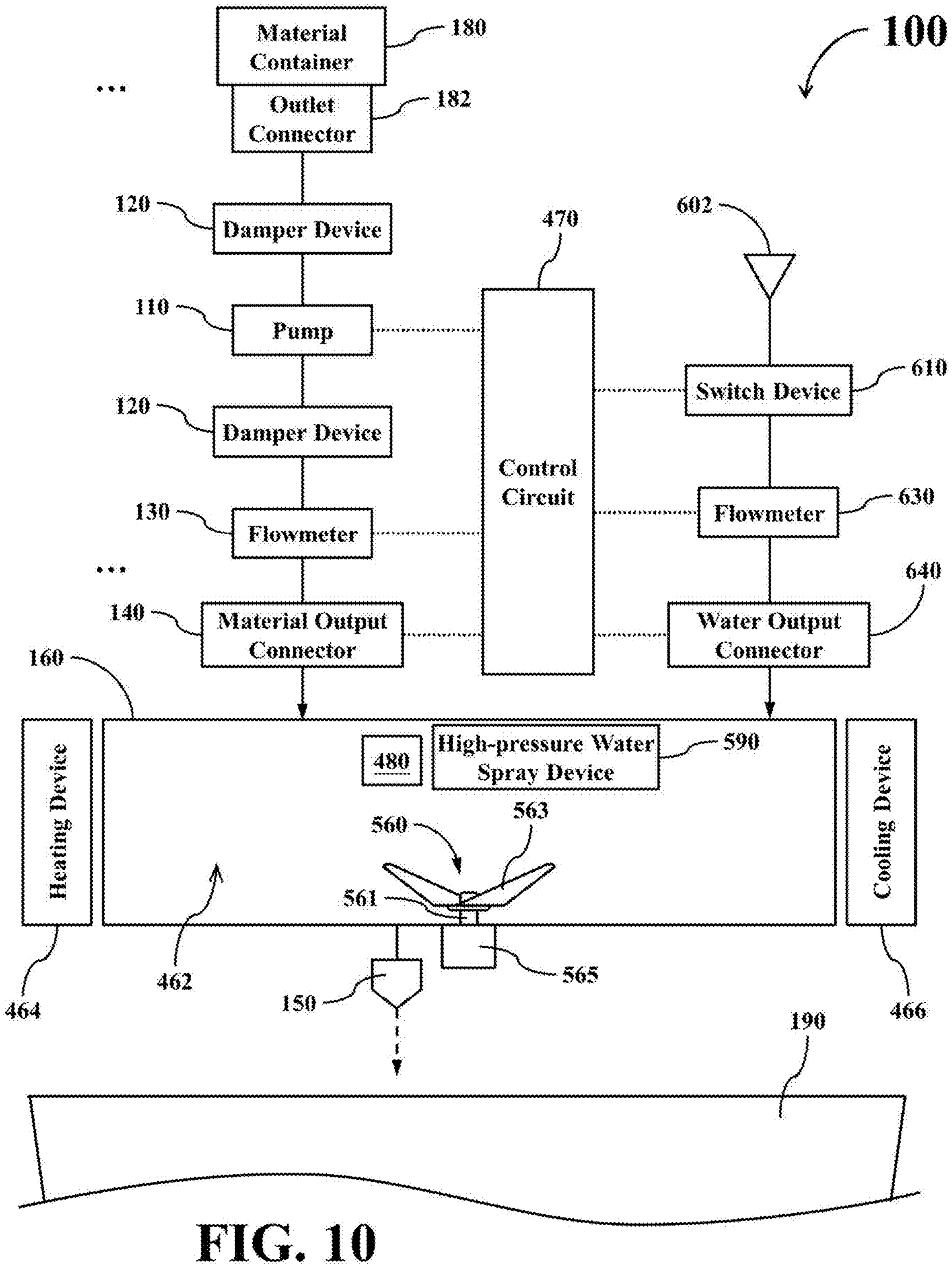
FIG. 10 shows a simplified functional block diagram of some components of the fluid material dispensing apparatus of FIG. 1 according to a seventh embodiment of the present disclosure.

For yet another example, in the embodiment of FIG. 10, the heating device 464 and the cooling device 466 are both arranged outside the adjustment chamber 462, and are located on opposite sides of the adjustment chamber 462. In addition, the heating device 464 and the cooling device 466 are both slightly separated from the outer surface of the adjustment chamber 462 with an appropriate spacing.

Figure 11:
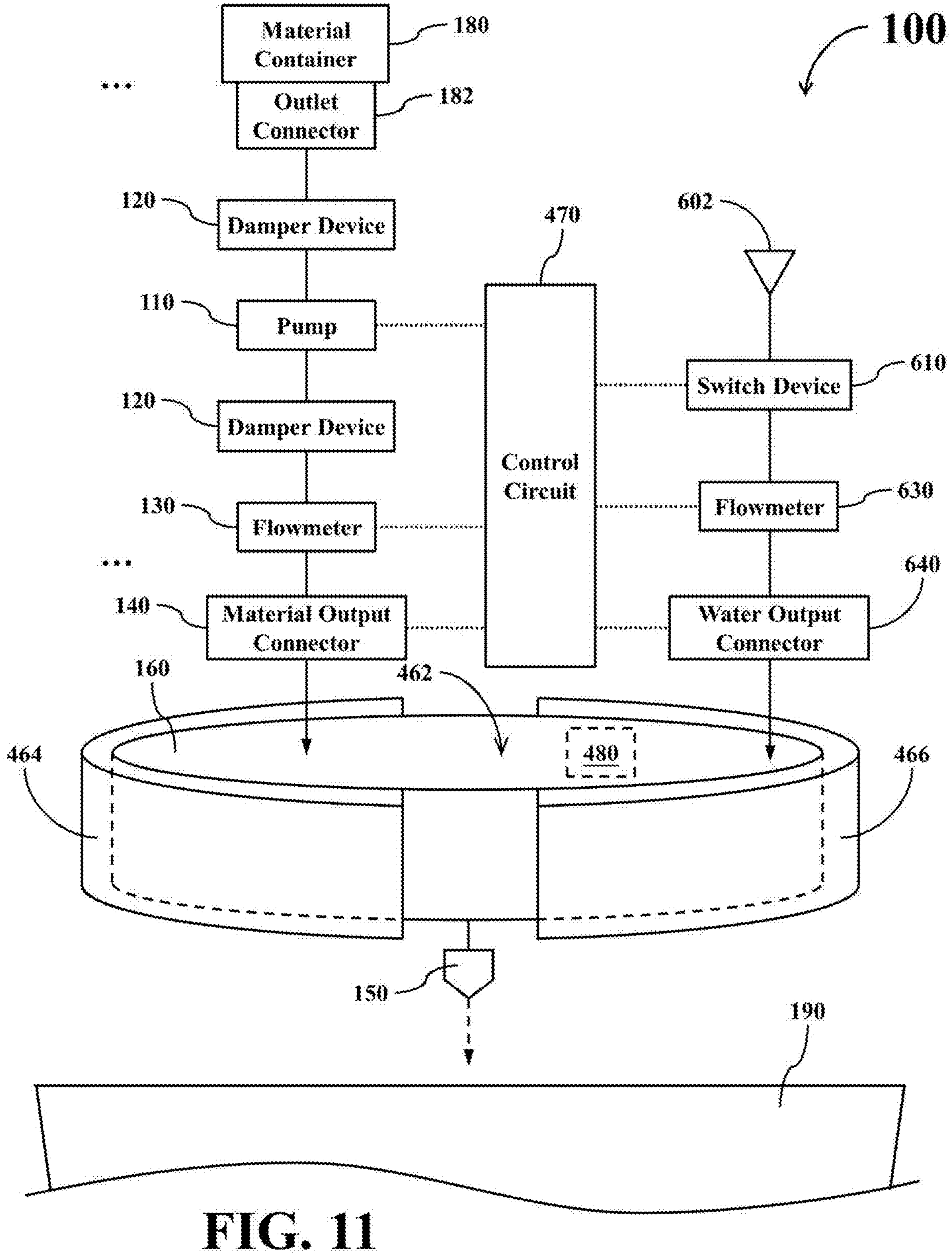
FIG. 11 shows a simplified functional block diagram of some components of the fluid material dispensing apparatus of FIG. 1 according to an eighth embodiment of the present disclosure.

For yet another example, in the embodiment of FIG. 11, the heating device 464 surrounds a portion of the outer surface of the adjustment chamber 462, while the cooling device 466 surrounds another portion of the outer surface of the adjustment chamber 462. The positions of the heating device 464 and the cooling device 466 are separated from each other, and an appropriate insulation zone or insulation device may be arranged between the heating device 464 and the cooling device 466. In addition, the heating device 464 and/or the cooling device 466 may be slightly separated from the outer surface of the adjustment chamber 462 with an appropriate spacing.

Figure 12:
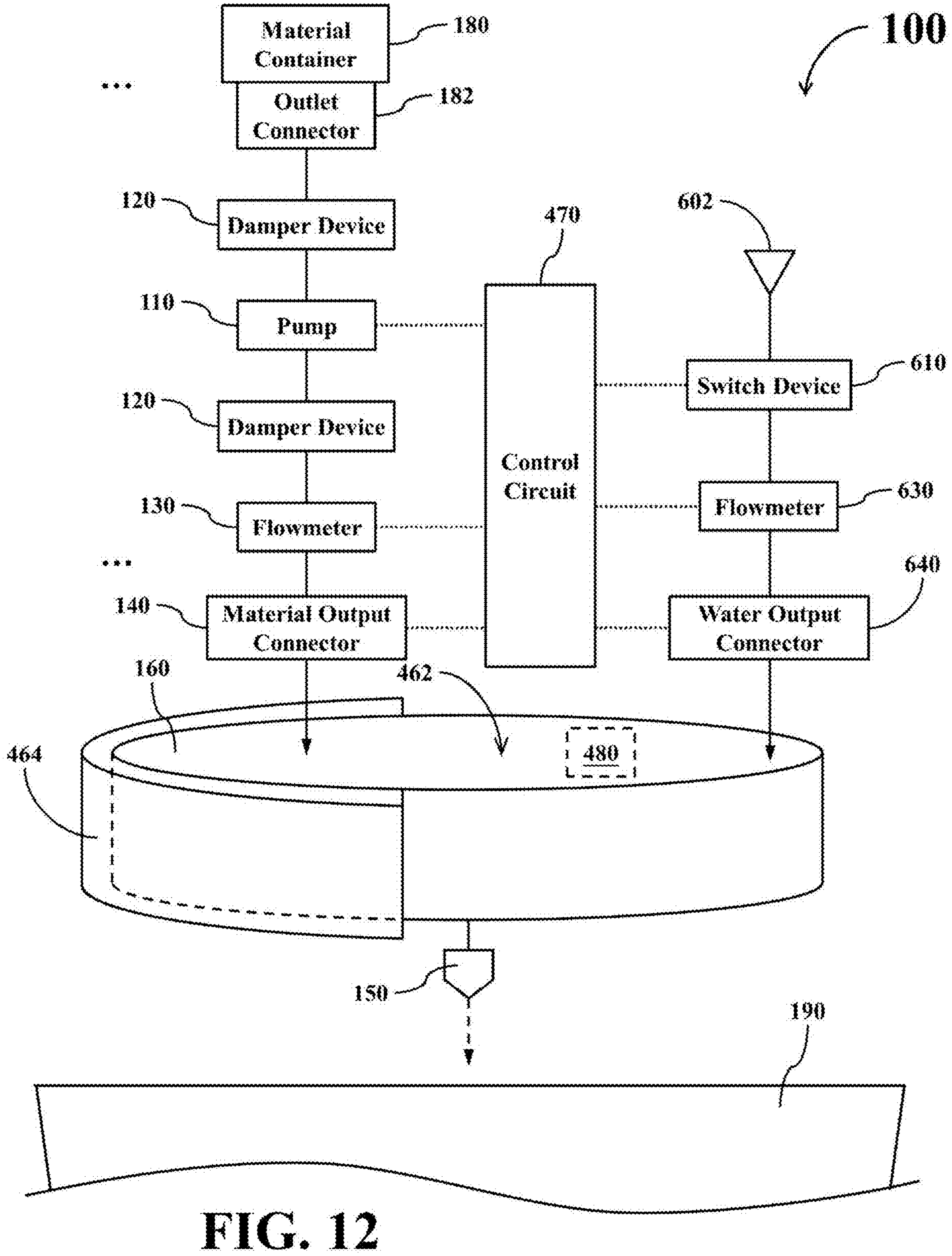
FIG. 12 shows a simplified functional block diagram of some components of the fluid material dispensing apparatus of FIG. 1 according to a ninth embodiment of the present disclosure.

For yet another example, in some embodiments, the cooling device 466 may be omitted as shown in FIG. 12.

Figure 13:
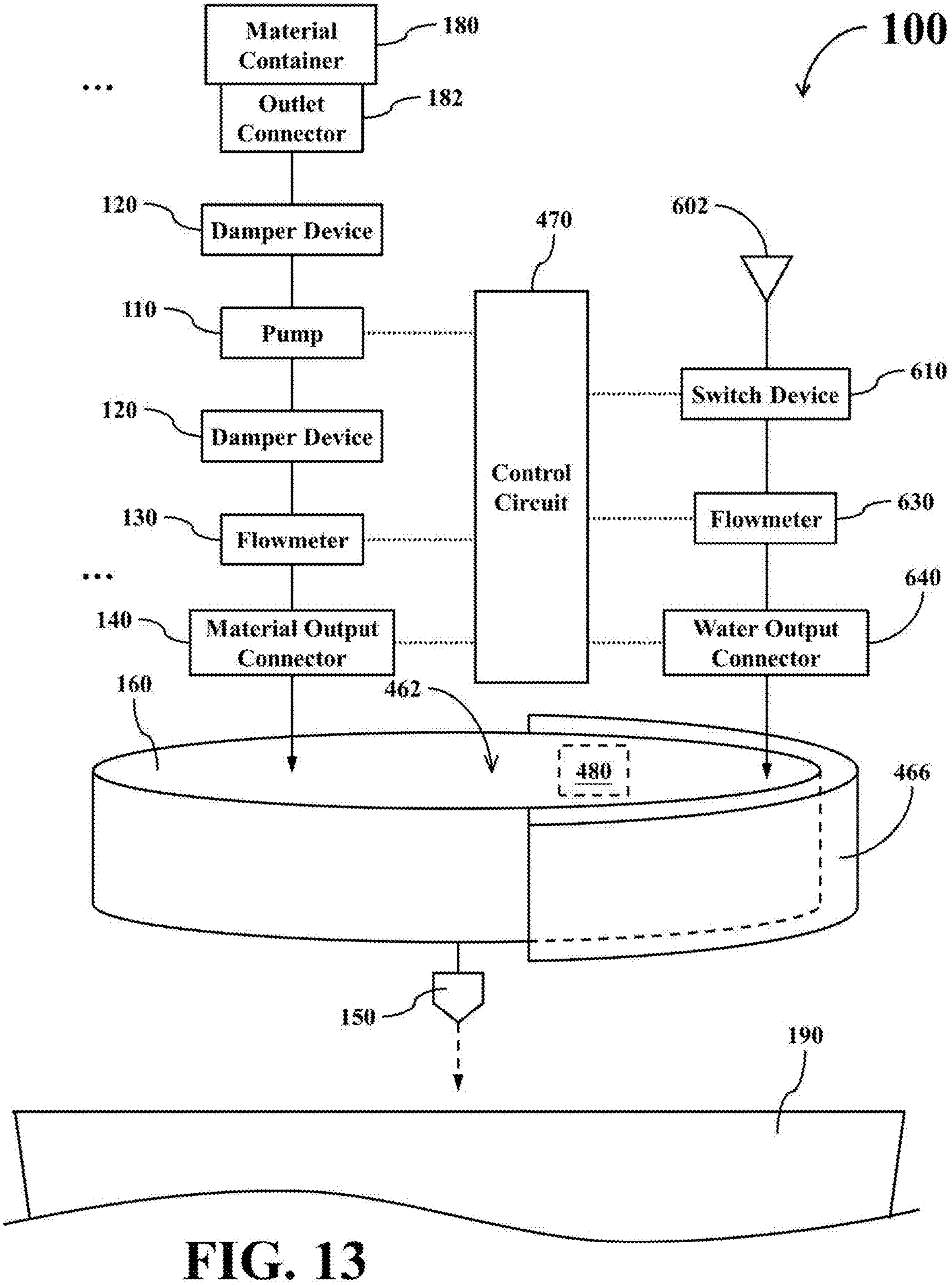
FIG. 13 shows a simplified functional block diagram of some components of the fluid material dispensing apparatus of FIG. 1 according to a tenth embodiment of the present disclosure.

For yet another example, in some embodiments, the heating device 464 may be omitted as shown in FIG. 13.

Figure 14:
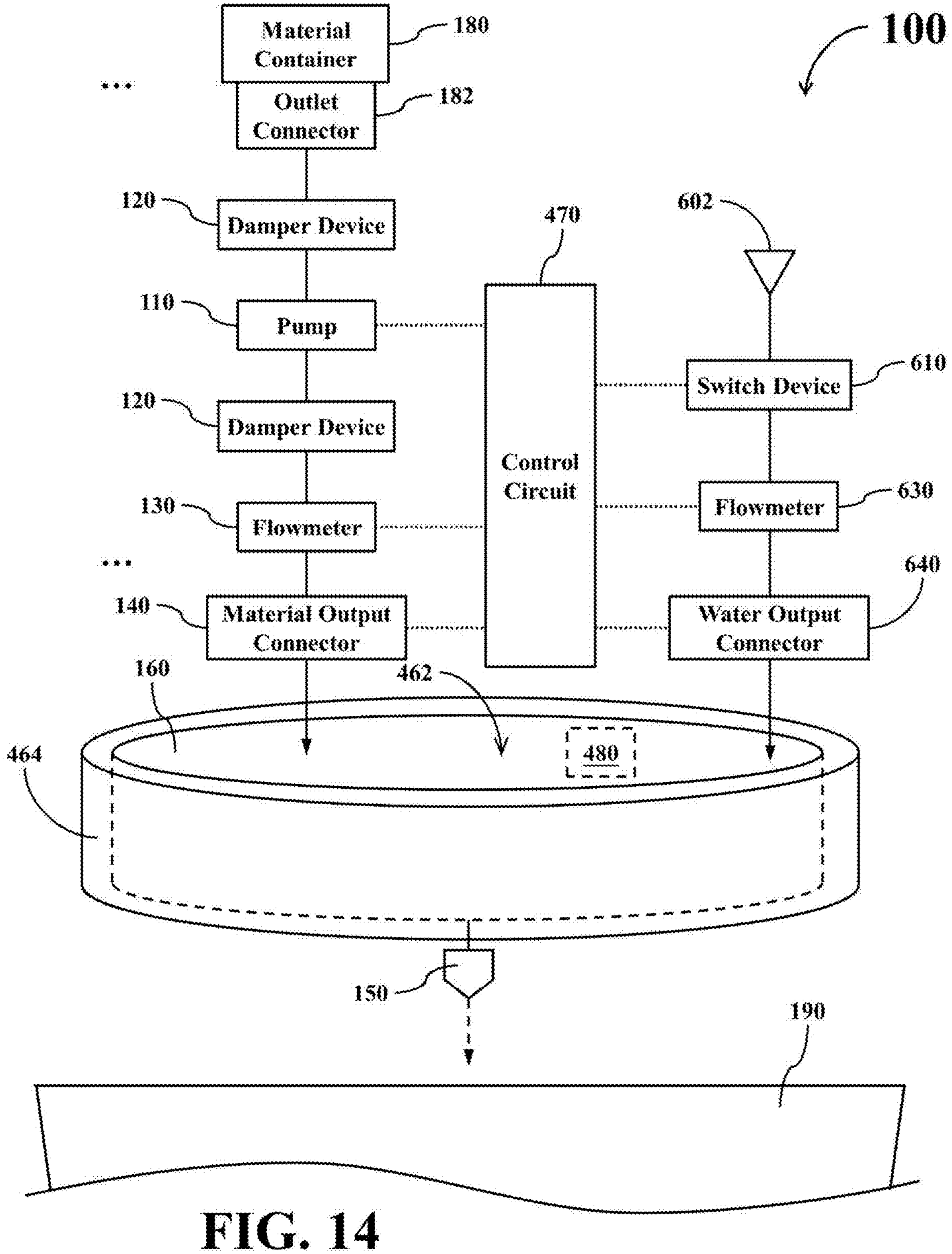
FIG. 14 shows a simplified functional block diagram of some components of the fluid material dispensing apparatus of FIG. 1 according to an eleventh embodiment of the present disclosure.

For yet another example, in some embodiments, the cooling device 466 may be omitted, and the heating device 464 may surround the outer surface of the adjustment chamber 462 as shown in FIG. 14.

For yet another example, in some embodiments, the blending device 560 may be omitted.

For yet another example, in some embodiments, the high-pressure water spray device 590 may be omitted.

In addition, the adjustment chamber 462, the heating device 464, and/or the cooling device 466 may be designed to have an appearance different from the embodiments described previously.

Figure 15:
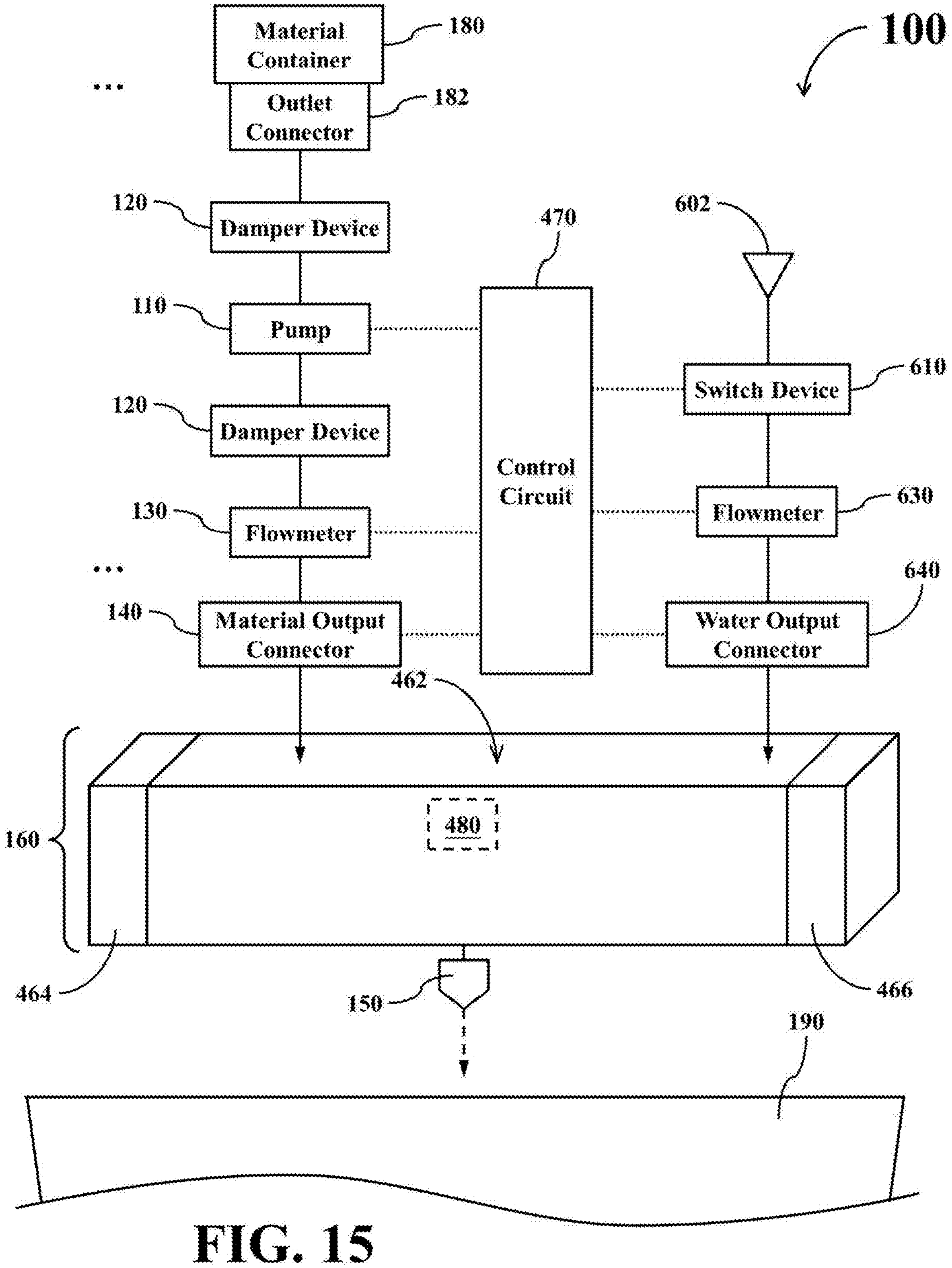
FIG. 15 shows a simplified functional block diagram of some components of the fluid material dispensing apparatus of FIG. 1 according to a twelfth embodiment of the present disclosure.
Figure 16:
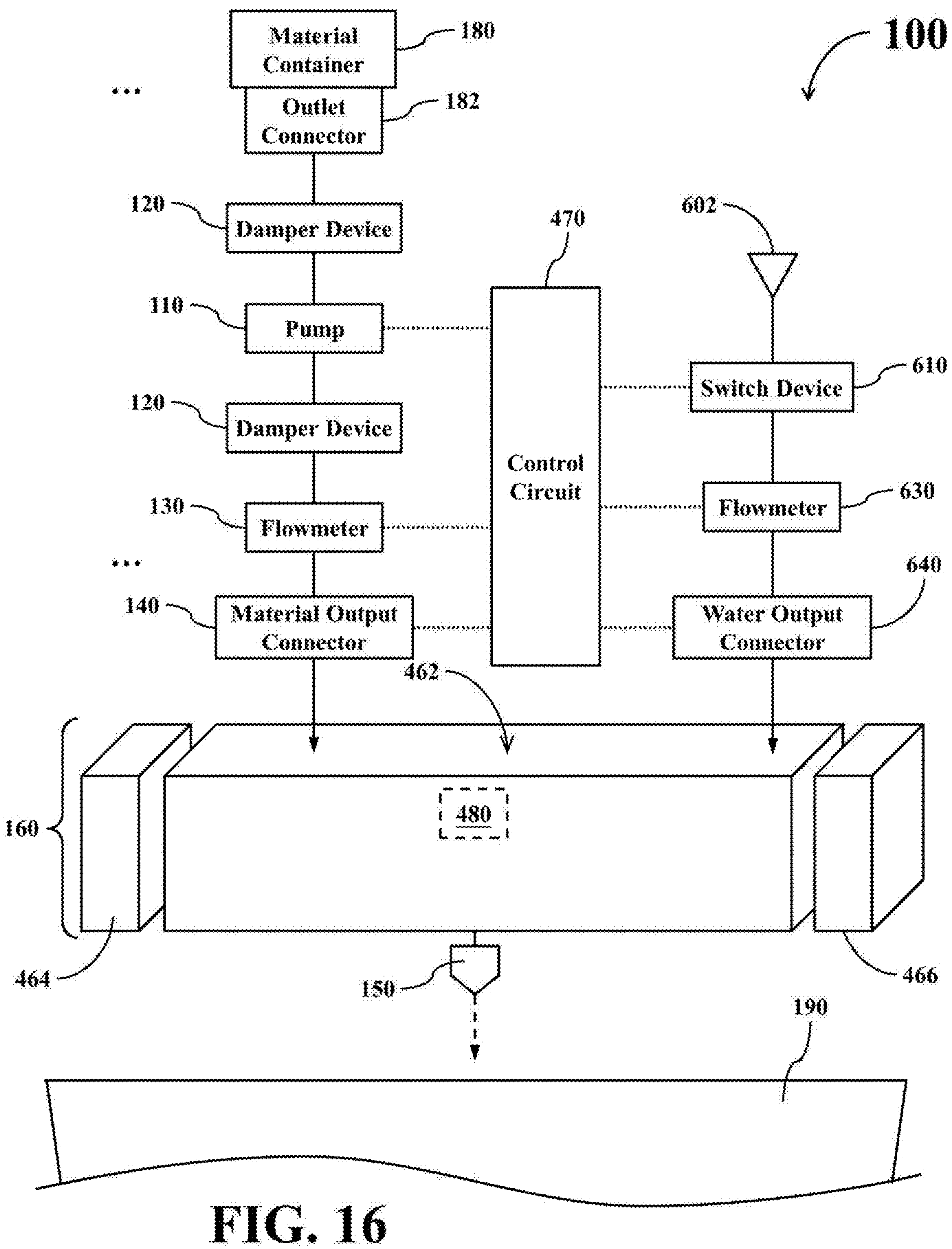
FIG. 16 shows a simplified functional block diagram of some components of the fluid material dispensing apparatus of FIG. 1 according to a thirteenth embodiment of the present disclosure.

For example, as shown in FIG. 15, the shape of the adjustment chamber 462 may be designed to be a square block or a rectangular block, while the shapes of the heating device 464 and the cooling device 466 are both designed to be square plates. In addition, as shown in FIG. 16, the heating device 464 and/or the cooling device 466 may be slightly separated from the outer surface of the adjustment chamber 462 with an appropriate spacing.

Figure 17:
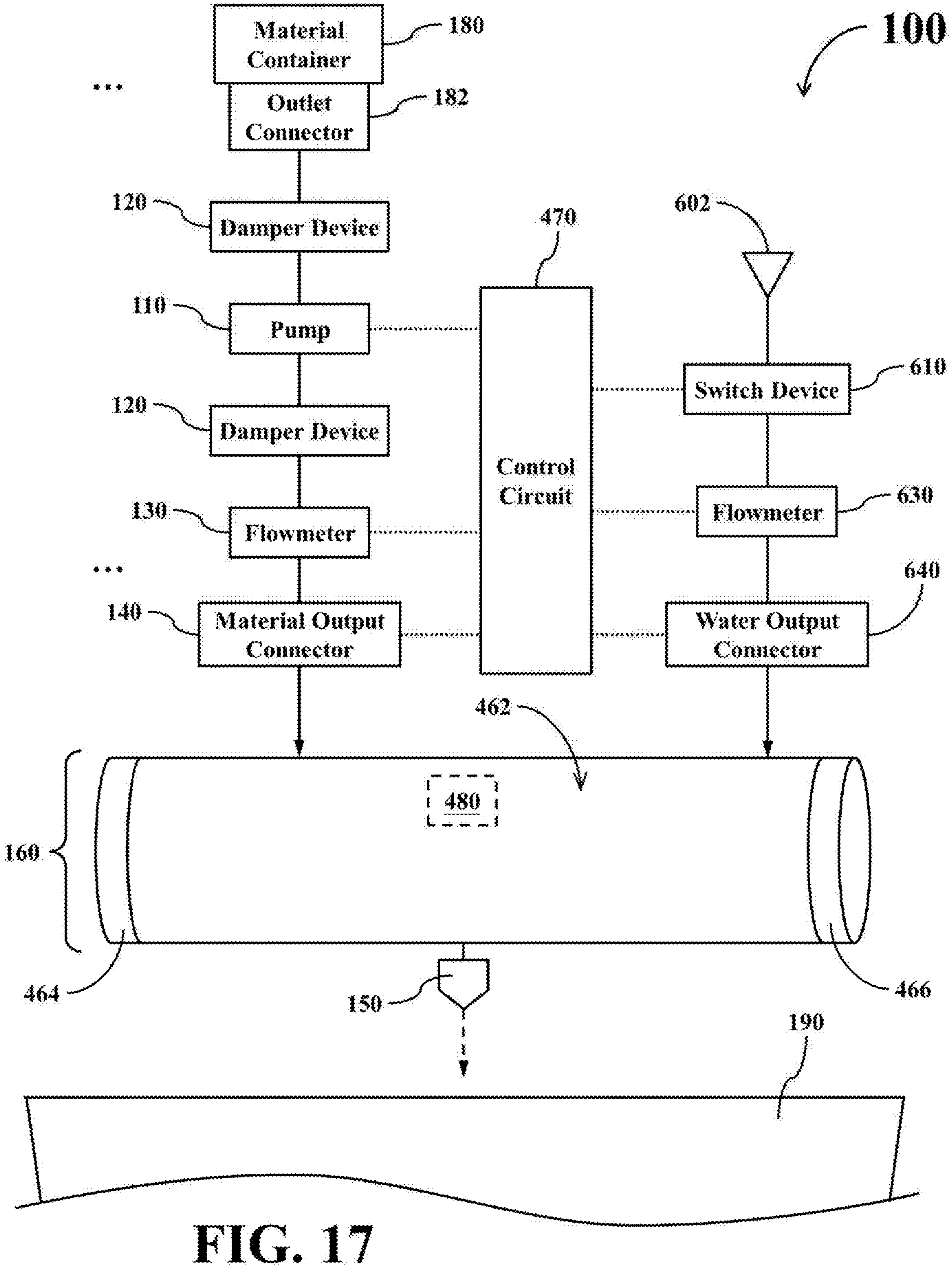
FIG. 17 shows a simplified functional block diagram of some components of the fluid material dispensing apparatus of FIG. 1 according to a fourteenth embodiment of the present disclosure.
Figure 18:
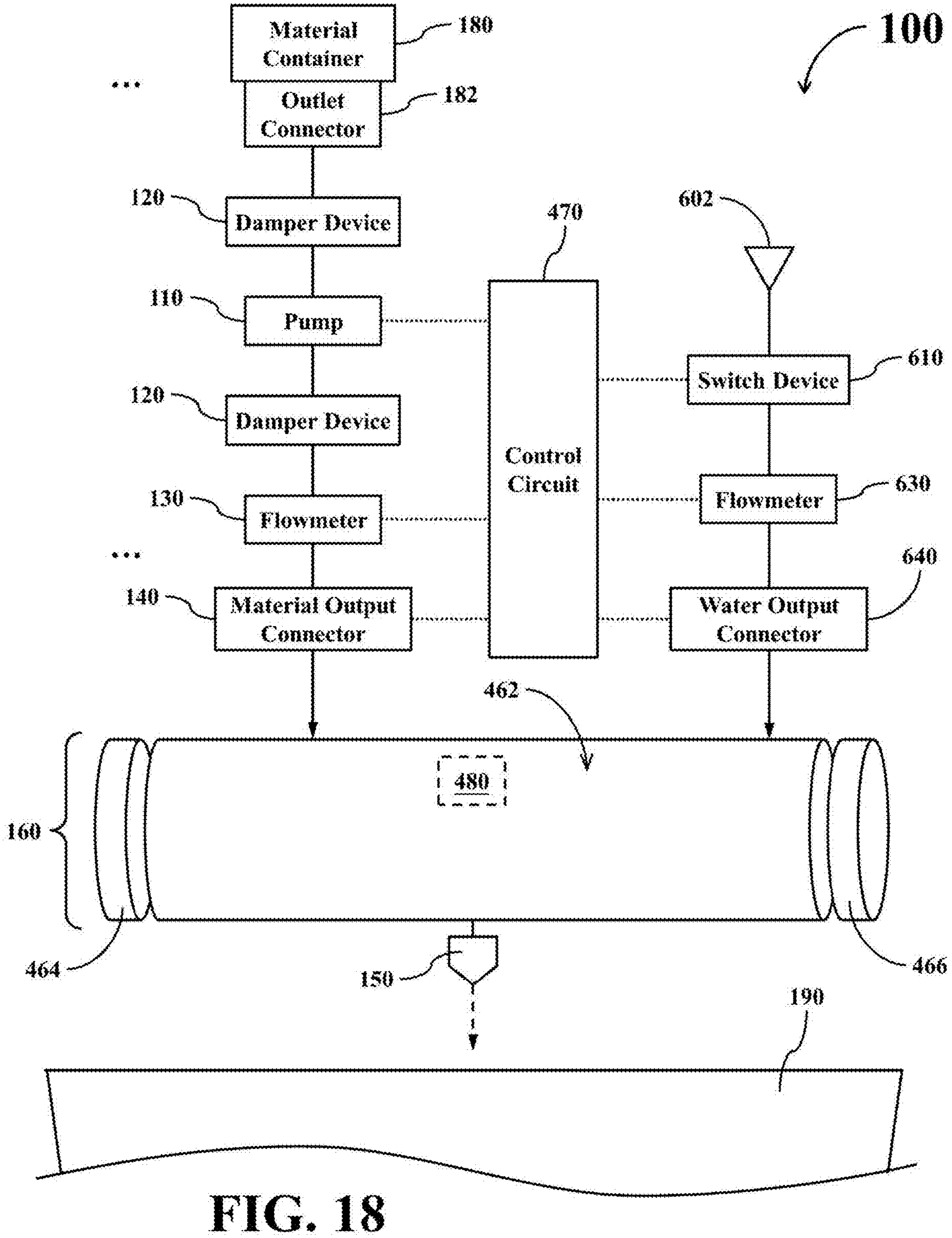
FIG. 18 shows a simplified functional block diagram of some components of the fluid material dispensing apparatus of FIG. 1 according to a fifteenth embodiment of the present disclosure.

For another example, as shown in FIG. 17, the shape of the adjustment chamber 462 may be designed to be cylindrical, a circular tank, or a circular barrel, while the shapes of the heating device 464 and the cooling device 466 are both designed to be circular plates. In addition, as shown in FIG. 18, the heating device 464 and/or the cooling device 466 may be slightly separated from the outer surface of the adjustment chamber 462 with an appropriate spacing.

In practice, the switch device 610 of FIG. 6 through FIG. 18 may be realized with a pump 610. In this situation, the control circuit 470 may control the pump 610 to operably push water supplied from the water input port 602 to flow toward the temperature adjustment device 160. The pump 610 may be realized with various appropriate liquid pump devices capable of pushing liquid forward, such as a peristaltic pump, a diaphragm pump, a rotary diaphragm pump, or the like.

In some embodiments, the flowmeter 130 of FIG. 1 through FIG. 18 may be omitted. In this situation, the fluid material dispensing apparatus 100 may utilize a weight scale to measure changes in the weight of the target container 190, and the control circuit 470 may calculate the output volume of the fluid materials based on the measurement results of the weight scale. As a result, the control circuit 470 is enabled to control the output volume of fluid materials without using the flowmeter 130.

Similarly, in some embodiments, the flowmeter 630 of FIG. 6 through FIG. 18 may be omitted. In this situation, the fluid material dispensing apparatus 100 may utilize a weight scale to measure changes in the weight of the target container 190, and the control circuit 470 may calculate the output volume of the water based on the measurement results of the weight scale. As a result, the control circuit 470 is enabled to control the output volume of water without using the flowmeter 630.

Certain terms are used throughout the description and the claims to refer to particular components. One skilled in the art appreciates that a component may be referred to as different names. This disclosure does not intend to distinguish between components that differ in name but not in function. In the description and in the claims, the term "comprise" is used in an open-ended fashion, and thus should be interpreted to mean "include, but not limited to." The term "couple" is intended to encompass any indirect or direct connection. For example, if this disclosure mentioned that a first circuit is coupled with a second circuit, it means that the first circuit may be directly or indirectly connected to the second circuit through electrical connections, wireless communications, optical communications, or other signal connections with/without other intermediate devices or connection means.

The term "and/or" may comprise any and all combinations of one or more of the associated listed items. In addition, the singular forms "a," "an," and "the" herein are intended to comprise the plural forms as well, unless the context clearly indicates otherwise.

Throughout the description and claims, the term "element" contains the concept of component, layer, or region.

In the drawings, the size and relative sizes of some elements may be exaggerated or simplified for clarity. Accordingly, unless the context clearly specifies, the shape, size, relative size, and relative position of each element in the drawings are illustrated merely for clarity, and not intended to be used to restrict the claim scope.

For the purpose of explanatory convenience in the specification, spatially relative terms, such as "on," "above," "below," "beneath," "higher," "lower," "upward," "downward," "forward," "backward," and the like, may be used herein to describe the function of a particular element or to describe the relationship of one element to other element(s) as illustrated in the drawings. It will be understood that the spatially relative terms are intended to encompass different orientations of the element in use, in operations, or in assembly in addition to the orientation depicted in the drawings. For example, if the element in the drawings is turned over, elements described as "on" or "above" other elements would then be oriented "under" or "beneath" the other elements. Thus, the exemplary term "beneath" can encompass both an orientation of above and beneath. For another example, if the element in the drawings is reversed, the action described as "forward" may become "backward," and the action described as "backward" may become "forward." Thus, the exemplary description "forward" can encompass both an orientation of forward and backward.

Throughout the description and claims, it will be understood that when an element is referred to as being "positioned on," "positioned above," "connected to," "engaged with," or "coupled with" another element, it can be directly on, directly connected to, or directly engaged with the other element, or intervening element may be present. In contrast, when an element is referred to as being "directly on," "directly connected to," or "directly engaged with" another element, there are no intervening elements present.

Other embodiments of the invention will be apparent to those skilled in the art from consideration of the specification and practice of the invention disclosed herein. It is intended that the specification and examples be considered as exemplary only, with a true scope and spirit of the invention indicated by the following claims.

What is claimed is:

1. A fluid material dispensing apparatus (100), comprising:

a material output connector (140);

a water output connector (640);

a pump (110), coupled between an outlet connector (182) of a material container (180) and the material output connector (140), and arranged to operably extract a fluid material from the material container (180) and to operably push the fluid material to flow toward the material output connector (140);

a water input port (602), coupled with the water output connector (640), and arranged to operably supply water to the water output connector (640);

a temperature adjustment device (160), coupled with the material output connector (140) and the water output connector (640), and arranged to operably receive the fluid material passed through the material output connector (140) and the water passed through the water output connector (640), so as to form a mixed material within the temperature adjustment device (160);

a nozzle (150), coupled with an output terminal of the temperature adjustment device (160);

a control circuit (470), arranged to operably control the pump (110) and the nozzle (150), and further arranged to operably control the temperature adjustment device (160) to adjust a temperature of the mixed material within the temperature adjustment device (160) to produce and output a temperature-adjusted material to the nozzle (150), so that the nozzle (150) outputs the temperature-adjusted material to a target container (190); and a temperature sensor (480), coupled with the control circuit (470);

wherein the temperature adjustment device (160) comprises:

an adjustment chamber (462), coupled with the material output connector (140), the water output connector (640), and the nozzle (150), and arranged to operably receive the fluid material and the water and to operably form the mixed material;

wherein the temperature sensor (480) is arranged to operably sense and report the temperature of the mixed material within the adjustment chamber (462) to the control circuit (470).

2. The fluid material dispensing apparatus (100) of claim 1, wherein the temperature adjustment device (160) further comprises:

a heating device (464), coupled with the control circuit (470), and arranged to operably heat the mixed material within the adjustment chamber (462).

3. The fluid material dispensing apparatus (100) of claim 2, wherein the heating device (464) is arranged inside the adjustment chamber (462).

4. The fluid material dispensing apparatus (100) of claim 1, wherein the temperature adjustment device (160) further comprises:

a cooling device (466), coupled with the control circuit (470), and arranged to operably cool the mixed material within the adjustment chamber (462).

5. The fluid material dispensing apparatus (100) of claim 4, wherein the cooling device (466) is arranged inside the adjustment chamber (462).

6. The fluid material dispensing apparatus (100) of claim 1, wherein the temperature adjustment device (160) further comprises:

a blending device (560), coupled with the control circuit (470), and arranged to operably blend the fluid material and the water within the adjustment chamber (462) to form the mixed material.

7. The fluid material dispensing apparatus (100) of claim 1, wherein the temperature adjustment device (160) further comprises:

a high-pressure water spray device (590), coupled with the control circuit (470), and arranged to operably spray a predetermined volume of high-pressure water to an inner surface of the adjustment chamber (462).

8. The fluid material dispensing apparatus (100) of claim 7, wherein the predetermined volume ranges from 20 milliliters to 150 milliliters.

9. The fluid material dispensing apparatus (100) of claim 1, further comprising:

a flowmeter (130), coupled between the outlet connector (182) and the temperature adjustment device (160), and arranged to operably measure a flow of the fluid material to be transmitted to the temperature adjustment device (160).

10. A fluid material dispensing apparatus (100), comprising:

a first output connector (140);

a second output connector (140);

a first pump (110), coupled between an outlet connector (182) of a first material container (180) and the first output connector (140), and arranged to operably extract a first fluid material from the first material container (180) and to operably push the first fluid material to flow toward the first output connector (140);

a second pump (110), coupled between an outlet connector (182) of a second material container (180) and the second output connector (140), and arranged to operably extract a second fluid material from the second material container (180) and to operably push the second fluid material to flow toward the second output connector (140);

a temperature adjustment device (160), coupled with the first output connector (140) and the second output connector (140), and arranged to operably receive the first fluid material passed through the first output connector (140) and the second fluid material passed through the second output connector (140), so as to form a mixed material within the temperature adjustment device (160);

a nozzle (150), coupled with an output terminal of the temperature adjustment device (160);

a control circuit (470), arranged to operably control the first pump (110), the second pump (110), and the nozzle (150), and further arranged to operably control the temperature adjustment device (160) to adjust a temperature of the mixed material within the temperature adjustment device (160) to produce and output a temperature-adjusted material to the nozzle (150), so that the nozzle (150) outputs the temperature-adjusted material to a target container (190); and a temperature sensor (480), coupled with the control circuit (470);

wherein the temperature adjustment device (160) comprises:

an adjustment chamber (462), coupled with the first output connector (140), the second output connector (140), and the nozzle (150), and arranged to operably receive the first fluid material and the second fluid material and to operably form the mixed material;

wherein the temperature sensor (480) is arranged to operably sense and report the temperature of the mixed material within the adjustment chamber (462) to the control circuit (470).

11. The fluid material dispensing apparatus (100) of claim 10, wherein the temperature adjustment device (160) further comprises:

a heating device (464), coupled with the control circuit (470), and arranged to operably heat the mixed material within the adjustment chamber (462).

12. The fluid material dispensing apparatus (100) of claim 11, wherein the heating device (464) is arranged inside the adjustment chamber (462).

13. The fluid material dispensing apparatus (100) of claim 10, wherein the temperature adjustment device (160) further comprises:

a cooling device (466), coupled with the control circuit (470), and arranged to operably cool the mixed material within the adjustment chamber (462).

14. The fluid material dispensing apparatus (100) of claim 13, wherein the cooling device (466) is arranged inside the adjustment chamber (462).

15. The fluid material dispensing apparatus (100) of claim 10, wherein the temperature adjustment device (160) further comprises:

a blending device (560), coupled with the control circuit (470), and arranged to operably blend the first fluid material and the second fluid material within the adjustment chamber (462) to form the mixed material.

16. The fluid material dispensing apparatus (100) of claim 10, wherein the temperature adjustment device (160) further comprises:

a high-pressure water spray device (590), coupled with the control circuit (470), and arranged to operably spray high-pressure water to an inner surface of the adjustment chamber (462).

17. The fluid material dispensing apparatus (100) of claim 10, further comprising:

a flowmeter (130), coupled between the outlet connector (182) of the first material container (180) and the temperature adjustment device (160), and arranged to operably measure a flow of the first fluid material to be transmitted to the temperature adjustment device (160).

18. A fluid material dispensing apparatus (100), comprising:

a material output connector (140);

a water output connector (640);

a pump (110), coupled between an outlet connector (182) of a material container (180) and the material output connector (140), and arranged to operably extract a fluid material from the material container (180) and to operably push the fluid material to flow toward the material output connector (140);

a water input port (602), coupled with the water output connector (640), and arranged to operably supply water to the water output connector (640);

a temperature adjustment device (160), comprising:

an adjustment chamber (462), coupled with the material output connector (140), the water output connector (640), and the nozzle (150), and arranged to operably receive the fluid material passed through the material output connector (140) and to operably receive the water passed through the water output connector (640);

a blending device (560), arranged to operably blend the fluid material and the water within the adjustment chamber (462) to form a mixed material;

a heating device (464), arranged to operably heat the mixed material within the adjustment chamber (462);

a cooling device (466), arranged to operably cool the mixed material within the adjustment chamber (462); and a high-pressure water spray device (590), arranged to operably spray a predetermined volume of high-pressure water to an inner surface of the adjustment chamber (462), wherein the predetermined volume ranges from 20 milliliters to 150 milliliters;

a flowmeter (130), coupled between the outlet connector (182) and the temperature adjustment device (160), and arranged to operably measure a flow of the fluid material to be transmitted to the temperature adjustment device (160);

a nozzle (150), coupled with an output terminal of the temperature adjustment device (160);

a control circuit (470), arranged to operably control the pump (110) and the nozzle (150), and further arranged to operably control the temperature adjustment device (160) to adjust a temperature of the mixed material within the temperature adjustment device (160) to produce and output a temperature-adjusted material to the nozzle (150), so that the nozzle (150) outputs the temperature-adjusted material to a target container (190); and a temperature sensor (480), coupled with the control circuit (470), and arranged to operably sense and report the temperature of the mixed material within the adjustment chamber (462) to the control circuit (470).

* * * * *